United States Patent
Mei et al.

(10) Patent No.: US 12,369,169 B2
(45) Date of Patent: Jul. 22, 2025

(54) SYSTEMS AND METHODS FOR INDICATION OF PHASE TRACKING REFERENCE SIGNAL- DEMODULATION REFERENCE SIGNAL ASSOCIATION

(71) Applicant: ZTE CORPORATION, Guangdong (CN)

(72) Inventors: Meng Mei, Shenzhen (CN); Chuangxin Jiang, Shenzhen (CN); Zhaohua Lu, Shenzhen (CN); Yu Pan, Shenzhen (CN); Yang Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 28 days.

(21) Appl. No.: 18/320,526

(22) Filed: May 19, 2023

(65) Prior Publication Data

US 2023/0371042 A1    Nov. 16, 2023

Related U.S. Application Data

(63) Continuation of application No. PCT/CN2020/130403, filed on Nov. 20, 2020.

(51) Int. Cl.
*H04W 72/232* (2023.01)
*H04L 5/00* (2006.01)
*H04W 72/1268* (2023.01)

(52) U.S. Cl.
CPC ......... *H04W 72/232* (2023.01); *H04L 5/0051* (2013.01); *H04W 72/1268* (2013.01)

(58) Field of Classification Search
CPC .. H04W 72/232; H04W 72/1268; H04L 1/08; H04L 5/0048; H04L 5/0051
See application file for complete search history.

(56) References Cited

U.S. PATENT DOCUMENTS

2019/0215118 A1* 7/2019 Molés Cases et al. ...................... H04L 41/0803
2020/0008270 A1* 1/2020 Zhang ................... H04L 27/261
(Continued)

FOREIGN PATENT DOCUMENTS

CN    108111283 A    6/2018
CN    108632179 A    10/2018
(Continued)

OTHER PUBLICATIONS

International Search Report and Written Opinion for PCT Appl. No. PCT/CN2020/130403, mailed Jul. 29, 2021 (9 pages).
(Continued)

*Primary Examiner* — Andrew Lee
(74) *Attorney, Agent, or Firm* — Foley & Lardner LLP

(57) ABSTRACT

Presented are systems and methods for indicating phase tracking reference signal-demodulation reference signal (PTRS-DMRS) association. A wireless communication device may receive a scheduling grant to trigger a first group of physical uplink shared channel (PUSCH) transmission occasions and a second group of PUSCH transmission occasions from a wireless communication node. The scheduling information carried by the scheduling grant may at least include port association information of PTRS-DMRS. The port association information may comprise a first port association for the first group of PUSCH transmission occasions and a second port association for the second group of PUSCH transmission occasions. The second port association may be at least associated with a portion of the scheduling information which is at least for the first group of PUSCH transmission occasions.

14 Claims, 28 Drawing Sheets

(56) References Cited

U.S. PATENT DOCUMENTS

| | | | |
|---|---|---|---|
| 2020/0244415 A1 | 7/2020 | Liu et al. | |
| 2021/0036746 A1* | 2/2021 | Liu | H04B 7/0456 |
| 2021/0337534 A1* | 10/2021 | Xiong | H04L 1/08 |
| 2022/0278802 A1* | 9/2022 | Noh | H04B 7/06 |
| 2022/0303097 A1* | 9/2022 | Zhang | H04L 1/08 |
| 2022/0345195 A1* | 10/2022 | Jang | H04L 5/0094 |
| 2023/0029850 A1* | 2/2023 | Park | H04L 1/1854 |
| 2023/0045134 A1* | 2/2023 | Yuan | H04L 5/0051 |
| 2023/0076789 A1* | 3/2023 | Oteri | H04W 52/346 |
| 2023/0085874 A1* | 3/2023 | Khoshnevisan | H04W 72/23 370/329 |
| 2023/0232415 A1* | 7/2023 | Kim | H04W 72/232 370/329 |
| 2023/0413197 A1* | 12/2023 | Zhu | H04L 5/0051 |

FOREIGN PATENT DOCUMENTS

| | | |
|---|---|---|
| CN | 109379172 A | 2/2019 |
| CN | 110351037 A | 10/2019 |
| CN | 110351851 A | 10/2019 |
| CN | 110891312 A | 3/2020 |
| CN | 111213414 A | 5/2020 |
| CN | 111436147 A | 7/2020 |
| CN | 111527729 A | 8/2020 |
| EP | 3 659 288 A1 | 6/2020 |
| WO | WO-2019/173976 A1 | 9/2019 |
| WO | WO-2020/034163 A1 | 2/2020 |
| WO | WO-2020/144773 A1 | 7/2020 |

OTHER PUBLICATIONS

Nokia et al.: "Clarification of PTRS port association for PUSCH corresponding to the configured grant type 1" 3GPP TSG-RAN WG1 Meeting #99; R1-1913008; Nov. 22, 2019; Reno, USA (5 pages).

Notification to Grant Patent Right for Invention with Search Report on Chinese Patent Application No. 202310992403.8, dated Jan. 31, 2024 (7 pages, including English translation).

Oppo, "Configured grant enhancements for URLLC," 3GPP TSG RAN WG1 #99, R1-1912523. Nov. 9, 2019 (5 pages).

ZTE, "Draft alignment CR on non-codebook based PUSCH," 3GPP TSG-RAN WG#1, Meeting # 99, R1-1908270, Aug. 17, 2019 (4 pages).

Extended European Search Report for EP Appl. No. 20961978.2, dated Feb. 15, 2024 (10 pages).

Moderator (Nokia, et al.), "Summary of Multi-TRP URLLC for PUCCH and PUSCH", 3GPP TSG RAN WG1 #103, R1-2009480, Nov. 13, 2020, e-Meeting (70 pages).

Vivo, "Further discussion on enhancement of MTRP operation", 3GPP TSG RAN WG1 #103-e, R1-2007645, Nov. 13, 2020, e-Meeting (15 pages).

Apple Inc., "On Multi-TRP Reliability Enhancement", 3GPP TSG-RAN WG1 Meeting #103-e, R1-2008439, Nov. 13, 2020, e-Meeting (10 pages).

Notice of Reasons for Rejection for JP Appl. No. 2023-530201, dated Apr. 16, 2024 (with English translation, 7 pages).

RAN1, "Corrections for NR MIMO—outcomes of RAN1#102-e", 3GPP TSG RAN #89e, RP-201809, Aug. 28, 2020 (29 pages).

* cited by examiner

PTRS-DMRS association for UL PTRS port 0

| Value | DMRS port |
|-------|-----------|
| 0 | 1st scheduled DMRS port of the first PUSCH transmission occasion group<br>1st scheduled DMRS port for the second PUSCH transmission occasion group |
| 1 | 2nd scheduled DMRS port of the first PUSCH transmission occasion group<br>1st scheduled DMRS port for the second PUSCH transmission occasion group |
| 2 | 1st scheduled DMRS port of the first PUSCH transmission occasion group<br>2nd scheduled DMRS port for the second PUSCH transmission occasion group |
| 3 | 2nd scheduled DMRS port of the first PUSCH transmission occasion group<br>2nd scheduled DMRS port for the second PUSCH transmission occasion group |

PTRS-DMRS association for UL PTRS port 0

| Value of MSB | DMRS port | Value of LSB | DMRS port |
|---|---|---|---|
| 0 | 1st scheduled DMRS port of the first PUSCH transmission occasion group | 0 | 1st scheduled DMRS port for the second PUSCH transmission occasion group |
| 1 | 2nd scheduled DMRS port of the first PUSCH transmission occasion group | 1 | 2nd scheduled DMRS port for the second PUSCH transmission occasion group |

Antenna port(s), transform precoder is disabled, *dmrs-Type*=1, *maxLength*=1, rank = 3

| Value | Number of DMRS CDM group(s) without data | DMRS port(s) | PTRS-DMRS association for PTRS port0 for the second PUSCH transmission occasion group | PTRS-DMRS association for shared PTRS port for the second PUSCH transmission occasion group |
|---|---|---|---|---|
| 0 | 2 | 0-2 | 1st scheduled DMRS port | 1st DMRS port which shares PTRS port |
| 1 | 2 | 0-2 | 2nd scheduled DMRS port | 2nd DMRS port which shares PTRS port |
| 2 | 2 | 0-2 | 3rd scheduled DMRS port | |
| 3-7 | Reserved | Reserved | | |

Antenna port(s), transform precoder is disabled, *dmrs-Type*=1, *maxLength*=1, rank = 4

| Value | Number of DMRS CDM group(s) without data | DMRS port(s) | PTRS-DMRS association for PTRS port0 for the second PUSCH transmission occasion group | PTRS-DMRS association for PTRS port0 and PTRS port1 for the second PUSCH transmission occasion group |
|---|---|---|---|---|
| 0 | 2 | 0-3 | 1st scheduled DMRS port | 1st DMRS port which shares PTRS port 0<br>1st DMRS port which shares PTRS port 1 |
| 1 | 2 | 0-3 | 2nd scheduled DMRS port | 2nd DMRS port which shares PTRS port 0<br>1st DMRS port which shares PTRS port 1 |
| 2 | 2 | 0-3 | 3rd scheduled DMRS port | 1st DMRS port which shares PTRS port 0<br>2nd DMRS port which shares PTRS port 1 |
| 3 | 2 | 0-3 | 4th scheduled DMRS port | 2nd DMRS port which shares PTRS port 0<br>2nd DMRS port which shares PTRS port 1 |
| 4-7 | Reserved | Reserved | | |

Antenna port(s), transform precoder is disabled, dmrs-Type=2, maxLength=1, rank =3

| Value | Number of DMRS CDM group(s) without data | DMRS port(s) | PTRS-DMRS association for PTRS port0 for the second PUSCH transmission occasion group | PTRS-DMRS association for shared PTRS port for the second PUSCH transmission occasion group |
|---|---|---|---|---|
| 0 | 2 | 0-2 | 1st scheduled DMRS port | 1st DMRS port which shares PTRS port |
| 1 | 3 | 0-2 | 1st scheduled DMRS port | 1st DMRS port which shares PTRS port |
| 2 | 3 | 3-5 | 1st scheduled DMRS port | 1st DMRS port which shares PTRS port |
| 3 | 2 | 0-2 | 2nd scheduled DMRS port | 2nd DMRS port which shares PTRS port |
| 4 | 3 | 0-2 | 2nd scheduled DMRS port | 2nd DMRS port which shares PTRS port |
| 5 | 3 | 3-5 | 2nd scheduled DMRS port | 2nd DMRS port which shares PTRS port |
| 6 | 2 | 0-2 | 3rd scheduled DMRS port | |
| 7 | 3 | 0-2 | 3rd scheduled DMRS port | |
| 8 | 3 | 3-5 | 3rd scheduled DMRS port | |
| 9-15 | Reserved | Reserved | | |

Antenna port(s), transform precoder is disabled, dmrs-Type=2, maxLength=1, rank=4

| Value | Number of DMRS CDM group(s) without data | DMRS port(s) | PTRS-DMRS association for PTRS port0 for the second PUSCH transmission occasion group | PTRS-DMRS association for PTRS port0 and PTRS port1 for the second PUSCH transmission occasion group |
|---|---|---|---|---|
| 0 | 2 | 0-3 | 1st scheduled DMRS port | 1st DMRS port which shares PTRS port 0 |
| 1 | 3 | 0-3 | | 1st DMRS port which shares PTRS port 1 |
| 2 | 2 | 0-3 | 2nd scheduled DMRS port | 2nd DMRS port which shares PTRS port 0 |
| 3 | 3 | 0-3 | | 1st DMRS port which shares PTRS port 1 |
| 4 | 2 | 0-3 | 3rd scheduled DMRS port | 1st DMRS port which shares PTRS port 0 |
| 5 | 3 | 0-3 | | 2nd DMRS port which shares PTRS port 1 |
| 6 | 2 | 0-3 | 4th scheduled DMRS port | 2nd DMRS port which shares PTRS port 0 |
| 7 | 3 | 0-3 | | 2nd DMRS port which shares PTRS port 1 |
| 8-15 | Reserved | Reserved | | |

Antenna port(s), transform precoder is disabled, *dmrs-Type*=1, *maxLength*=2, rank = 3

| Value | Number of DMRS CDM group(s) without data | DMRS port(s) | Number of front-load symbols | PTRS-DMRS association for PTRS port0 for the second PUSCH transmission occasion group | PTRS-DMRS association for shared PTRS port for the second PUSCH transmission occasion group |
|---|---|---|---|---|---|
| 0 | 2 | 0-2 | 1 | 1st scheduled DMRS port | 1st DMRS port which shares PTRS port |
| 1 | 2 | 0,1,4 | 2 | | |
| 2 | 2 | 2,3,6 | 2 | | |
| 3 | 2 | 0-2 | 1 | 2nd scheduled DMRS port | 2nd DMRS port which shares PTRS port |
| 4 | 2 | 0,1,4 | 2 | | |
| 5 | 2 | 2,3,6 | 2 | | |
| 6 | 2 | 0-2 | 1 | 3rd scheduled DMRS port | |
| 7 | 2 | 0,1,4 | 2 | | |
| 8 | 2 | 2,3,6 | 2 | | |
| 9-15 | Reserved | Reserved | Reserved | | |

Antenna port(s), transform precoder is disabled, *dmrs-Type*=1, *maxLength*=2, rank = 4

| Value | Number of DMRS CDM group(s) without data | DMRS port(s) | Number of front-load symbols | PTRS-DMRS association for PTRS port0 for the second PUSCH transmission occasion group | PTRS-DMRS association for PTRS port0 and PTRS port1 for the second PUSCH transmission occasion group |
|---|---|---|---|---|---|
| 0 | 2 | 0-3 | 1 | 1st scheduled DMRS port | 1st DMRS port shares PTRS port 0<br>1st DMRS port shares PTRS port 1 |
| 1 | 2 | 0,1,4,5 | 2 | | |
| 2 | 2 | 2,3,6,7 | 2 | | |
| 3 | 2 | 0,2,4,6 | 2 | | |
| 4 | 2 | 0-3 | 1 | 2nd scheduled DMRS port | 2nd DMRS port shares PTRS port 0<br>1st DMRS port shares PTRS port 1 |
| 5 | 2 | 0,1,4,5 | 2 | | |
| 6 | 2 | 2,3,6,7 | 2 | | |
| 7 | 2 | 0,2,4,6 | 2 | | |
| 8 | 2 | 0-3 | 1 | 3rd scheduled DMRS port | 1st DMRS port shares PTRS port 0<br>2nd DMRS port shares PTRS port 1 |
| 9 | 2 | 0,1,4,5 | 2 | | |
| 10 | 2 | 2,3,6,7 | 2 | | |
| 11 | 2 | 0,2,4,6 | 2 | | |
| 12 | 2 | 0-3 | 1 | 4th scheduled DMRS port | 2nd DMRS port shares PTRS port 0<br>2nd DMRS port shares PTRS port 1 |
| 13 | 2 | 0,1,4,5 | 2 | | |
| 14 | 2 | 2,3,6,7 | 2 | | |
| 15 | 2 | 0,2,4,6 | 2 | | |

FIG. 12

Antenna port(s), transform precoder is disabled, *dmrs-Type=2, maxLength=2*, rank=3

| Value | Number of DMRS CDM group(s) without data | DMRS port(s) | Number of front-load symbols | PTRS-DMRS association for PTRS port0 for the second PUSCH transmission occasion group | PTRS-DMRS association for shared PTRS port for the second PUSCH transmission occasion group |
|---|---|---|---|---|---|
| 0 | 2 | 0-2 | 1 | 1st scheduled DMRS port | 1st DMRS port which shares PTRS port |
| 1 | 3 | 0-2 | 1 | | |
| 2 | 3 | 3-5 | 1 | | |
| 3 | 3 | 0,1,6 | 2 | | |
| 4 | 3 | 2,3,8 | 2 | | |
| 5 | 3 | 4,5,10 | 2 | | |
| 6 | 2 | 0-2 | 1 | 2nd scheduled DMRS port | 2nd DMRS port which shares PTRS port |
| 7 | 3 | 0-2 | 1 | | |
| 8 | 3 | 3-5 | 1 | | |
| 9 | 3 | 0,1,6 | 2 | | |
| 10 | 3 | 2,3,8 | 2 | | |
| 11 | 3 | 4,5,10 | 2 | | |
| 12 | 2 | 0-2 | 1 | 3rd scheduled DMRS port | - |
| 13 | 3 | 0-2 | 1 | | |
| 14 | 3 | 3-5 | 1 | | |
| 15 | 3 | 0,1,6 | 2 | | |
| 16 | 3 | 2,3,8 | 2 | | |
| 17 | 3 | 4,5,10 | 2 | | |
| 18-31 | Reserved | Reserved | Reserved | | |

Antenna port(s), transform precoder is disabled, dmrs-Type=2, maxLength=2, rank=4

| Value | Number of DMRS CDM group(s) without data | DMRS port(s) | Number of front-load symbols | PTRS-DMRS association for PTRS port0 for the second PUSCH transmission occasion group | PTRS-DMRS association for PTRS port0 and PTRS port1 for the second PUSCH transmission occasion group |
|---|---|---|---|---|---|
| 0 | 2 | 0-3 | 1 | 1st scheduled DMRS port | 1st DMRS port which shares PTRS port 0<br>1st DMRS port which shares PTRS port 1 |
| 1 | 3 | 0-3 | 1 | | |
| 2 | 3 | 0,1,6,7 | 2 | | |
| 3 | 3 | 2,3,8,9 | 2 | | |
| 4 | 3 | 4,5,10,11 | 2 | | |
| 5 | 2 | 0-3 | 1 | 2nd scheduled DMRS port | 2nd DMRS port which shares PTRS port 0<br>1st DMRS port which shares PTRS port 1 |
| 6 | 3 | 0-3 | 1 | | |
| 7 | 3 | 0,1,6,7 | 2 | | |
| 8 | 3 | 2,3,8,9 | 2 | | |
| 9 | 3 | 4,5,10,11 | 2 | | |
| 10 | 2 | 0-3 | 1 | 3rd scheduled DMRS port | 1st DMRS port which shares PTRS port 0<br>2nd DMRS port which shares PTRS port 1 |
| 11 | 3 | 0-3 | 1 | | |
| 12 | 3 | 0,1,6,7 | 2 | | |
| 13 | 3 | 2,3,8,9 | 2 | | |
| 14 | 3 | 4,5,10,11 | 2 | | |
| 15 | 2 | 0-3 | 1 | 4th scheduled DMRS port | 2nd DMRS port which shares PTRS port 0<br>2nd DMRS port which shares PTRS port 1 |
| 16 | 3 | 0-3 | 1 | | |
| 17 | 3 | 0,1,6,7 | 2 | | |
| 18 | 3 | 2,3,8,9 | 2 | | |
| 19 | 3 | 4,5,10,11 | 2 | | |
| 20-31 | Reserved | Reserved | | | |

FIG. 14

Precoding matrix W for three-layer transmission using four antenna ports with transform precoding disabled.

| TPMI index | W (ordered from left to right in increasing order of TPMI index) | | | | Same symbols (*, **, ***) indicate same PTRS-DMRS association. |
|---|---|---|---|---|---|
| 0-3 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\0&0&1\\0&0&0\end{bmatrix}$ | |
| 4-7 | $\frac{1}{2\sqrt{3}}\begin{bmatrix}1&1&1\\1&-1&1\\1&1&-1\\-1&1&1\end{bmatrix}$ * | $\frac{1}{2\sqrt{3}}\begin{bmatrix}1&1&1\\-1&1&1\\1&-1&1\\1&1&-1\end{bmatrix}$ * | $\frac{1}{2\sqrt{3}}\begin{bmatrix}1&1&1\\1&-1&1\\-1&1&1\\1&1&-1\end{bmatrix}$ * | $\frac{1}{2\sqrt{3}}\begin{bmatrix}1&1&1\\1&1&-1\\1&-1&1\\-1&1&1\end{bmatrix}$ * | |
| 8-11 | $\frac{1}{2}\begin{bmatrix}1&0&0\\0&1&0\\1&0&0\\0&0&1\end{bmatrix}$ * | $\frac{1}{2}\begin{bmatrix}1&0&0\\0&1&0\\0&1&0\\0&0&1\end{bmatrix}$ * | $\frac{1}{2\sqrt{3}}\begin{bmatrix}1&1&-1\\1&-1&1\\1&1&1\\-1&1&1\end{bmatrix}$ * | $\frac{1}{2}\begin{bmatrix}1&0&0\\0&1&0\\1&0&0\\0&0&1\end{bmatrix}$ * | |
| 12-15 | $\frac{1}{2\sqrt{3}}\begin{bmatrix}1&1&-1\\1&-1&1\\1&1&1\\-1&1&1\end{bmatrix}$ ** | $\frac{1}{2\sqrt{3}}\begin{bmatrix}1&1&-1\\-1&1&1\\1&-1&1\\1&1&1\end{bmatrix}$ ** | $\frac{1}{2\sqrt{3}}\begin{bmatrix}1&1&1\\1&-1&1\\1&1&-1\\-1&1&1\end{bmatrix}$ ** | $\frac{1}{2\sqrt{3}}\begin{bmatrix}1&1&-1\\1&1&1\\1&-1&1\\-1&1&1\end{bmatrix}$ ** | |
| 16-19 | $\frac{1}{2}\begin{bmatrix}1&0&0\\0&1&0\\0&0&1\\0&1&0\end{bmatrix}$ ** | $\frac{1}{2}\begin{bmatrix}1&0&0\\0&0&1\\0&1&0\\0&0&1\end{bmatrix}$ ** | $\frac{1}{2}\begin{bmatrix}1&0&0\\0&1&0\\0&0&1\\1&0&0\end{bmatrix}$ ** | $\frac{1}{2}\begin{bmatrix}1&0&0\\0&0&1\\0&1&0\\0&0&1\end{bmatrix}$ ** | |
| 20-23 | $\frac{1}{2\sqrt{3}}\begin{bmatrix}1&1&1\\1&-1&1\\j&j&-j\\-j&j&j\end{bmatrix}$ *** | $\frac{1}{2\sqrt{3}}\begin{bmatrix}1&1&1\\-1&1&1\\j&-j&j\\j&j&-j\end{bmatrix}$ *** | $\frac{1}{2\sqrt{3}}\begin{bmatrix}1&1&-1\\1&1&1\\j&j&-j\\-j&j&j\end{bmatrix}$ *** | $\frac{1}{2\sqrt{3}}\begin{bmatrix}1&1&1\\1&1&-1\\j&-j&j\\-j&j&j\end{bmatrix}$ *** | |
| 24-27 | $\frac{1}{2\sqrt{3}}\begin{bmatrix}1&1&1\\1&-1&1\\1&1&-1\\-1&1&1\end{bmatrix}$ *** | $\frac{1}{2\sqrt{3}}\begin{bmatrix}1&1&1\\-1&1&1\\1&-1&1\\1&1&-1\end{bmatrix}$ *** | $\frac{1}{2\sqrt{3}}\begin{bmatrix}1&1&-1\\1&1&1\\1&-1&1\\-1&1&1\end{bmatrix}$ *** | $\frac{1}{2\sqrt{3}}\begin{bmatrix}1&1&1\\1&-1&1\\j&j&-j\\-j&j&j\end{bmatrix}$ *** | |

Precoding matrix W for four-layer transmission using four antenna ports with transform precoding disabled.

| TPMI index | W (ordered from left to right in increasing order of TPMI index) | | | | Same symbols (*, **, ***) indicate same PTRS-DMRS association. |
|---|---|---|---|---|---|
| 0-3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&1&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\j&-j&0&0\\0&0&j&-j\end{bmatrix}$ | $\frac{1}{4}\begin{bmatrix}1&1&1&1\\1&-1&1&-1\\1&1&-1&-1\\1&-1&-1&1\end{bmatrix}$ | |
| 4-7 | $\frac{1}{4}\begin{bmatrix}1&1&1&1\\1&-1&1&-1\\j&-j&j&-j\\j&-j&-j&j\end{bmatrix}$ * | $\frac{1}{2\sqrt{2}}\begin{bmatrix}1&1&0&0\\0&0&1&1\\1&-1&0&0\\0&0&-j&j\end{bmatrix}$ * | $\frac{1}{2\sqrt{2}}\begin{bmatrix}1&1&0&0\\0&0&1&1\\j&-j&0&0\\0&0&-1&1\end{bmatrix}$ * | $\frac{1}{4}\begin{bmatrix}1&0&0&0\\1&0&0&0\\0&1&0&0\\0&0&1&0\end{bmatrix}$ * | |
| 8-11 | $\frac{1}{4}\begin{bmatrix}1&1&1&1\\1&-1&1&-1\\1&1&-1&-1\\-1&1&1&-1\end{bmatrix}$ * | $\frac{1}{4}\begin{bmatrix}1&1&1&1\\-1&1&1&-1\\1&1&-1&-1\\1&-1&1&-1\end{bmatrix}$ * | $\frac{1}{2}\begin{bmatrix}1&0&0&0\\0&1&0&0\\0&0&1&0\\0&0&0&1\end{bmatrix}$ ** | $\frac{1}{2}\begin{bmatrix}1&0&0&0\\0&0&1&0\\0&1&0&0\\0&0&0&1\end{bmatrix}$ ** | |
| 12-15 | $\frac{1}{4}\begin{bmatrix}1&1&1&1\\-1&-1&1&1\\1&-1&1&-1\\-1&1&1&-1\end{bmatrix}$ ** | $\frac{1}{4}\begin{bmatrix}1&1&1&1\\-1&-1&1&1\\j&j&-j&-j\\-j&-j&-j&j\end{bmatrix}$ ** | $\frac{1}{4}\begin{bmatrix}1&1&1&1\\j&j&-j&-j\\1&-1&1&-1\\j&-j&-j&j\end{bmatrix}$ *** | $\frac{1}{2}\begin{bmatrix}1&0&0&0\\0&0&1&0\\0&0&0&1\\0&1&0&0\end{bmatrix}$ *** | |
| 16-19 | $\frac{1}{2\sqrt{2}}\begin{bmatrix}1&1&0&0\\0&0&1&1\\j&-j&0&0\\0&0&j&-j\end{bmatrix}$ *** | $\frac{1}{2\sqrt{2}}\begin{bmatrix}1&1&0&0\\0&0&1&1\\1&-1&0&0\\0&0&-1&1\end{bmatrix}$ *** | $\frac{1}{4}\begin{bmatrix}1&1&1&1\\1&-1&-1&1\\1&-1&1&-1\\-1&1&-1&1\end{bmatrix}$ *** | $\frac{1}{4}\begin{bmatrix}1&1&1&1\\1&-1&1&-1\\j&-j&j&-j\\-j&j&j&-j\end{bmatrix}$ *** | |

FIG. 17

Precoding matrix W for two-layer (rank 2) transmission using four antenna ports with transform precoding disabled.

| TPMI index | W (ordered from left to right in increasing order of TPMI index) | | | |
|---|---|---|---|---|
| 0-3 | $\frac{1}{2\sqrt{2}}\begin{bmatrix}1 & 1\\1 & -1\\1 & 1\\1 & -1\end{bmatrix}$ | $\frac{1}{2\sqrt{2}}\begin{bmatrix}1 & 1\\1 & -1\\-1 & 1\\-1 & -1\end{bmatrix}$ | $\frac{1}{2\sqrt{2}}\begin{bmatrix}1 & 1\\-1 & 1\\1 & 1\\-1 & -1\end{bmatrix}$ | $\frac{1}{2\sqrt{2}}\begin{bmatrix}1 & 1\\-1 & 1\\-1 & -1\\1 & -1\end{bmatrix}$ |
| 4-7 | $\frac{1}{2\sqrt{2}}\begin{bmatrix}1 & 1\\1 & -1\\j & j\\j & -j\end{bmatrix}$ | $\frac{1}{2\sqrt{2}}\begin{bmatrix}1 & 1\\1 & -1\\-j & -j\\-j & j\end{bmatrix}$ | $\frac{1}{2\sqrt{2}}\begin{bmatrix}1 & 1\\-1 & 1\\j & j\\-j & j\end{bmatrix}$ | $\frac{1}{2\sqrt{2}}\begin{bmatrix}1 & 1\\-1 & 1\\-j & -j\\j & -j\end{bmatrix}$ |
| 8-11* | $\frac{1}{2\sqrt{2}}\begin{bmatrix}1 & 1\\j & j\\1 & -1\\j & -j\end{bmatrix}$ | $\frac{1}{2\sqrt{2}}\begin{bmatrix}1 & 1\\j & j\\-1 & 1\\-j & j\end{bmatrix}$ | $\frac{1}{2\sqrt{2}}\begin{bmatrix}1 & 1\\-j & -j\\1 & -1\\-j & j\end{bmatrix}$ | $\frac{1}{2\sqrt{2}}\begin{bmatrix}1 & 1\\-j & -j\\-1 & 1\\j & -j\end{bmatrix}$ |
| 12-15* | $\frac{1}{2\sqrt{2}}\begin{bmatrix}1 & 1\\-1 & -1\\1 & -1\\-1 & 1\end{bmatrix}$ | $\frac{1}{2\sqrt{2}}\begin{bmatrix}1 & 1\\-j & -j\\j & -j\\1 & -1\end{bmatrix}$ | $\frac{1}{2\sqrt{2}}\begin{bmatrix}1 & 1\\-1 & -1\\-j & j\\j & -j\end{bmatrix}$ | $\frac{1}{2\sqrt{2}}\begin{bmatrix}1 & 1\\j & j\\-j & j\\1 & -1\end{bmatrix}$ |

*Same symbol (*) indicates same PTRS-DMRS association.*

FIG. 18

Precoding matrix W for three-layer transmission using four antenna ports with transform precoding disabled.

| TPMI index | W (ordered from left to right in increasing order of TPMI index) | | | | Same symbols (*, **) indicate same PTRS-DMRS association. |
|---|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ * | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 1 & 0 & 0 \\ 0 & 1 & 0 \\ 0 & 0 & 1 \\ 0 & 1 & 0 \end{bmatrix}$ * | |
| 4-7 | $\frac{1}{2}\begin{bmatrix} 1 & 0 & 0 \\ 0 & 1 & 0 \\ 1 & 0 & 0 \\ 0 & -1 & 0 \end{bmatrix}$ * | $\frac{1}{2}\begin{bmatrix} 1 & 0 & 0 \\ 0 & 1 & 0 \\ -1 & 0 & 0 \\ 0 & 0 & 1 \end{bmatrix}$ * | $\frac{1}{2}\begin{bmatrix} 1 & 0 & 0 \\ 0 & 1 & 0 \\ 0 & -1 & 0 \\ 0 & 0 & 1 \end{bmatrix}$ ** | $\frac{1}{2}\begin{bmatrix} 1 & 0 & 0 \\ 0 & 1 & 0 \\ 0 & 0 & 1 \\ 0 & 0 & 1 \end{bmatrix}$ ** | |
| 8 | $\frac{1}{2}\begin{bmatrix} 1 & 0 & 0 \\ 0 & 1 & 0 \\ -1 & 0 & 0 \\ 0 & 0 & 1 \end{bmatrix}$ ** | | | | |

FIG. 19

Precoding matrix W for four-layer transmission using four antenna ports with transform precoding disabled.

| TPMI index | W (ordered from left to right in increasing order of TPMI index) | | | | Same symbols (*, **, ***) indicate same PTRS-DMRS association. |
|---|---|---|---|---|---|
| 0-3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&1&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\1&-1&0&0\\0&0&1&-1\end{bmatrix}$ * | $\frac{1}{2}\begin{bmatrix}1&0&0&0\\0&1&0&0\\0&0&1&0\\0&0&0&1\end{bmatrix}$ * | |
| 4-7 | $\frac{1}{2\sqrt{2}}\begin{bmatrix}1&1&0&0\\0&0&1&1\\1&-1&0&0\\0&0&1&-1\end{bmatrix}$ * | $\frac{1}{2\sqrt{2}}\begin{bmatrix}1&1&0&0\\0&0&j&-j\\1&-1&0&0\\0&0&j&-j\end{bmatrix}$ * | $\frac{1}{2\sqrt{2}}\begin{bmatrix}1&1&0&0\\0&0&j&-j\\1&-1&0&0\\0&0&j&-j\end{bmatrix}$ ** | $\frac{1}{2}\begin{bmatrix}1&0&0&0\\0&1&0&0\\0&0&1&0\\0&0&0&1\end{bmatrix}$ ** | |
| 8-11 | $\frac{1}{2\sqrt{2}}\begin{bmatrix}1&1&0&0\\0&0&1&1\\j&-j&0&0\\0&0&j&-j\end{bmatrix}$ ** | $\frac{1}{2}\begin{bmatrix}1&0&0&0\\0&1&0&0\\0&0&1&0\\0&0&0&1\end{bmatrix}$ *** | $\frac{1}{2\sqrt{2}}\begin{bmatrix}1&1&0&0\\0&0&1&1\\1&-1&0&0\\0&0&1&-1\end{bmatrix}$ *** | $\frac{1}{2\sqrt{2}}\begin{bmatrix}1&1&0&0\\0&0&1&1\\j&-j&0&0\\0&0&j&-j\end{bmatrix}$ *** | |

FIG. 20

2100 SRI indication for non-codebook based PUSCH transmission, $L_{max} = 4$

| Bit field mapped to index | SRI(s), $N_{SRS} = 4$ | SRI(s) for the second SRS resource set, $N_{SRS} = 4$ | PTRS-DMRS association of PTRS port0 for the second PUSCH transmission occasion group | PTRS-DMRS association for shared PTRS port for the second PUSCH transmission occasion group |
|---|---|---|---|---|
| 0 | 0 | 0,1,2 | 1st scheduled DMRS port | 1st DMRS port which shares PTRS port |
| 1 | 1 | 0,1,3 | | |
| 2 | 2 | 0,2,3 | | |
| 3 | 3 | 1,2,3 | | |
| 4 | 0,1 | 0,1,2 | 2nd scheduled DMRS port | 2nd DMRS port which shares PTRS port |
| 5 | 0,2 | 0,1,3 | | |
| 6 | 0,3 | 0,2,3 | | |
| 7 | 1,2 | 1,2,3 | | |
| 8 | 1,3 | 0,1,2 | 3rd scheduled DMRS port | - |
| 9 | 2,3 | 0,1,3 | | |
| 10 | 0,1,2 | 0,2,3 | | |
| 11 | 0,1,3 | 1,2,3 | | |
| 12 | 0,2,3 | 0,1,2,3 | 1st scheduled DMRS port | 1st DMRS port which shares PTRS port 0 |
| 13 | 1,2,3 | 0,1,2,3 | 2nd scheduled DMRS port | 2nd DMRS port which shares PTRS port 0 |
| 14 | 0,1,2,3 | 0,1,2,3 | 3rd scheduled DMRS port | 1st DMRS port which shares PTRS port 1 |
| 15 | reserved | 0,1,2,3 | 4th scheduled DMRS port | 2nd DMRS port which shares PTRS port 1 |

FIG. 21

SRI indication for non-codebook based PUSCH transmission, $L_{max} = 4$

| Bit field mapped to index | SRI(s) for the second SRS resource set, $N_{SRS} = 4$ | PTRS-DMRS association of PTRS port0 for the second PUSCH transmission occasion group, $N_{SRS} = 4$ | PTRS-DMRS association for shared PTRS port for the second PUSCH transmission occasion group, $N_{SRS} = 4$ |
|---|---|---|---|
| 0 | 0,1,2,3 | 1st scheduled DMRS port | 1st DMRS port which shares PTRS port 0 |
| 1 | 0,1,2,3 | 2nd scheduled DMRS port | 2nd DMRS port which shares PTRS port 0 |
| 2 | 0,1,2,3 | 3rd scheduled DMRS port | 1st DMRS port which shares PTRS port 1 |
| 3 | 0,1,2,3 | 4th scheduled DMRS port | 2nd DMRS port which shares PTRS port 1 |
| 4-15 | reserved | reserved | reserved |

SRI indication for non-codebook based PUSCH transmission, $L_{max}$ = 4 or 3

| Bit field mapped to index | SRI(s) for the second SRS resource set, $N_{SRS}$ = 3 | PTRS-DMRS association of PTRS port0 for the second PUSCH transmission occasion group, $N_{SRS}$ = 3 | PTRS-DMRS association for shared PTRS port for the second PUSCH transmission occasion group, $N_{SRS}$ = 3 |
|---|---|---|---|
| 0 | 0,1,2 | 1st scheduled DMRS port | 1st DMRS port which shares PTRS port |
| 1 | 0,1,2 | 2nd scheduled DMRS port | 2nd DMRS port which shares PTRS port |
| 2 | 0,1,2 | 3rd scheduled DMRS port | |
| 3-7 | reserved | reserved | reserved |

SYSTEMS AND METHODS FOR INDICATION OF PHASE TRACKING REFERENCE SIGNAL- DEMODULATION REFERENCE SIGNAL ASSOCIATION

CROSS-REFERENCE TO RELATED APPLICATION

This application claims the benefit of priority under 35 U.S.C. § 120 as a continuation of International Patent Application No. PCT/CN2020/130403, filed on Nov. 20, 2020, the disclosure of which is incorporated herein by reference in its entirety.

TECHNICAL FIELD

The disclosure relates generally to wireless communications, including but not limited to systems and methods for indicating phase tracking reference signal-demodulation reference signal (PTRS-DMRS) association.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a scheduling grant to trigger a first group of physical uplink shared channel (PUSCH) transmission occasions and a second group of PUSCH transmission occasions from a wireless communication node. The scheduling information carried by the scheduling grant may at least include port association information of PTRS-DMRS. The port association information may comprise a first port association for the first group of PUSCH transmission occasions and a second port association for the second group of PUSCH transmission occasions. The second port association may be at least associated with a portion of the scheduling information which is at least for the first group of PUSCH transmission occasions.

In some embodiments, the scheduling grant may comprise one downlink control information (DCI) or higher layer parameter signaling for one configured grant. In some embodiments, each of the first and second groups of PUSCH transmission occasions may be associated with at least one of a sounding reference signal (SRS) resource set, a SRS resource, a spatial relation, a transmission configuration indication (TCI) state, a PUSCH frequency hop, quasi co-location (QCL) information, or a set of power control parameters. In some embodiments, the second port association may be determined according to at least one of a SRS resource indicator (SRI) field, a transmission precoding matrix indicator (TPMI) field, an antenna port field for DMRS, or a PUSCH occasion number.

In some embodiments, the scheduling grant may comprise a downlink control information (DCI). In some embodiments, a PTRS-DMRS association field of the DCI may indicate the first port association and the second port association. In some embodiments, the PTRS-DMRS association field may comprise a plurality of bits. In some embodiments, a first portion of the plurality of bits may be used to indicate the first port association. In some embodiments, a second portion of the plurality of bits may be used to indicate the second port association. In some embodiments, a number of transmission layers may be 2 for the first group of PUSCH transmission occasions and for the second group of PUSCH transmission occasions.

In some embodiments, the antenna port field, the TPMI field, or the SRI field may be indicative of a value that identifies the second port association. In certain embodiments, at least one bit of the antenna port indication field may be used to indicate the second port association, the at least one bit can comprise or may be indicated by at least one bit of at least one of: an antenna ports field, the TPMI field, or the SRI field.

In some embodiments, at least another/one bit of the antenna port indication field may be used to indicate scheduled DMRS ports. In some embodiments, at least one/another bit of the antenna port indication field may be used to indicate the second port association. In some embodiments, at least another/one bit of the TPMI field or the SRI field may be used to indicate a scheduling precoding matrix or the SRS resource. In some embodiments, at least one/another bit of the antenna port indication field may be used to indicate the second port association.

In some embodiments, a new field (e.g., a field of x bits) may be defined to indicate the second port association. In some embodiments, there is a reduction of at least x bits from at least one of the antenna port indication field, the TPMI field, or the SRI field. In some embodiments, x may be a positive integer. In some embodiments, the second port association for each PUSCH transmission occasion of the second group of PUSCH transmission occasions may vary in a configured or predefined manner (e.g., a cyclic manner) according to a respective PUSCH occasion number of the PUSCH transmission occasion. In some embodiments, the scheduling information (e.g., a portion of the scheduling information) may comprise at least one of a number of layers being implemented, or an antenna port indication of DMRS. In some embodiments, a number of transmission layers may be larger than 2 for the first group of PUSCH transmission occasions and for the second group of PUSCH transmission occasions. In certain embodiments, the second port association may be same as the first port association, and both the first port association and the second port association can be indicated by a PTRS-DMRS field in downlink control information (DCI). In some embodiments, the second port association may be predefined or configured by higher layer parameter signaling. In some embodiments, an antenna port field of the DMRS may be absent/excluded/omitted from the scheduling grant.

At least one aspect is directed to a system, method, apparatus, or a computer-readable medium. A wireless communication node may send a scheduling grant to trigger a first group of physical uplink shared channel (PUSCH) transmission occasions and a second group of PUSCH transmission occasions from a wireless communication node. The scheduling information carried by the scheduling grant may at least include port association information of PTRS-DMRS. The port association information may comprise a first port association for the first group of PUSCH transmission occasions and a second port association for the second group of PUSCH transmission occasions. The second port association may be at least associated with a portion of the scheduling information which is at least for the first group of PUSCH transmission occasions.

One or more SRS resource sets may be configured for multi-TRP (MTRP) PUSCH transmissions. A DCI field may indicate/provide/specify/identify an association between a PTRS port and a DMRS port (e.g., PTRS-DMRS association information). The DMRS port may be associated/related to a second SRS resource set. The PTRS-DMRS association information for one or more PUSCH transmission occasion groups may be indicated by a PTRS-DMRS association field of the DCI (or other DCI fields).

A DMRS port(s) indication may be used to specify the PTRS-DMRS association information of one or more PUSCH transmission occasion groups. The one or more PUSCH transmission occasion groups may be associated with one or more SRS resource sets (or one or more SRS resource sets configurations). An entry of the DMRS port indication can be used to specify the PTRS-DMRS association information for at least one of the one or more PUSCH transmission occasion groups. The bit information of the DMRS port indication may be used to indicate the PTRS-DMRS association information of a (e.g., second or additional) PUSCH transmission occasion group (e.g., associated with a second SRS resource set).

The PTRS-DMRS association information of the (e.g., second/additional) PUSCH transmission occasion group (e.g., associated with the second SRS resource set) can be specified by the entry of a TPMI field, antenna port indication field (for DMRS) and/or SRI field of the DCI. The PTRS-DMRS association information of the PUSCH transmission occasion group (e.g., associated with the second SRS resource set) may be specified by the bit information of the TPMI and/or SRI. The PTRS-DMRS association information of the PUSCH transmission occasion group may be indicated according to a PUSCH transmission occasion number (e.g., in a cyclic manner).

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered as limiting of the breadth, scope, or applicability of the present solution. It should be noted that for clarity and ease of illustration, these drawings are not necessarily drawn to scale.

FIGS. 5-7 illustrate various approaches/configurations for using at least two bits to indicate the association/relationship between the PTRS and the DMRS, in accordance with some embodiments of the present disclosure;

FIG. 8 illustrates example approaches/configurations for indicating the PTRS-DMRS association information for rank 4 transmissions, in accordance with some embodiments of the present disclosure;

FIGS. 9-10 illustrate various approaches/configurations for indicating the PTRS-DMRS association information using a type 2 DMRS, in accordance with some embodiments of the present disclosure;

FIGS. 11-12 illustrate various approaches/configurations for indicating the PTRS-DMRS association information using a type 1 DMRS, in accordance with some embodiments of the present disclosure;

FIGS. 13-14 illustrate various approaches/configurations for indicating the PTRS-DMRS association information for rank 3 and/or rank 4 transmissions using type 2 DMRS, in accordance with some embodiments of the present disclosure;

FIGS. 16-20 illustrate various approaches/configurations for indicating the PTRS-DMRS association information using the TPMI indication, in accordance with some embodiments of the present disclosure;

FIGS. 21-23 illustrate various approaches/configurations for indicating the PTRS-DMRS association information using the SRI of the DCI, in accordance with some embodiments of the present disclosure;

DETAILED DESCRIPTION

1 Mobile Communication Technology and Environment

Figure 1:
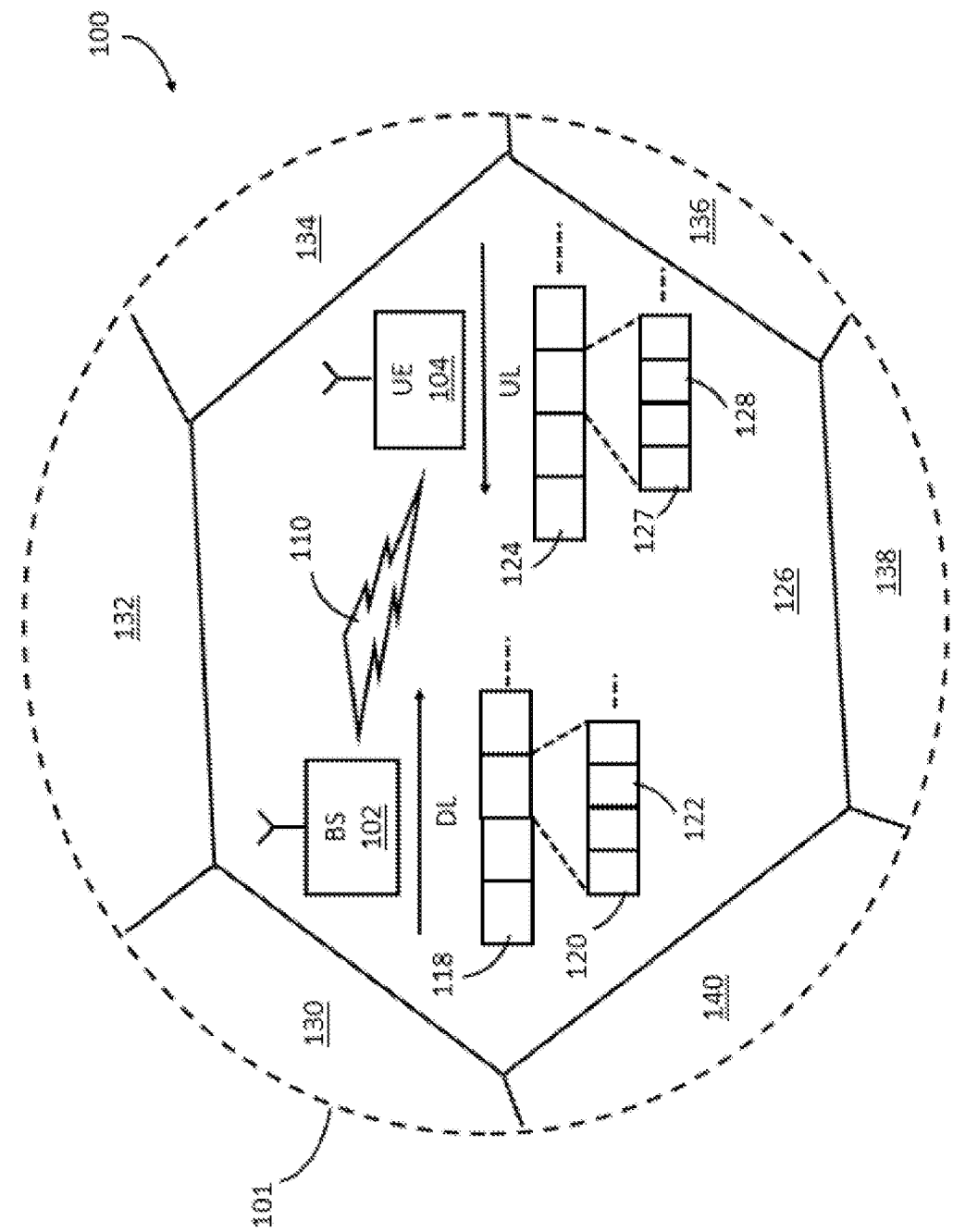
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
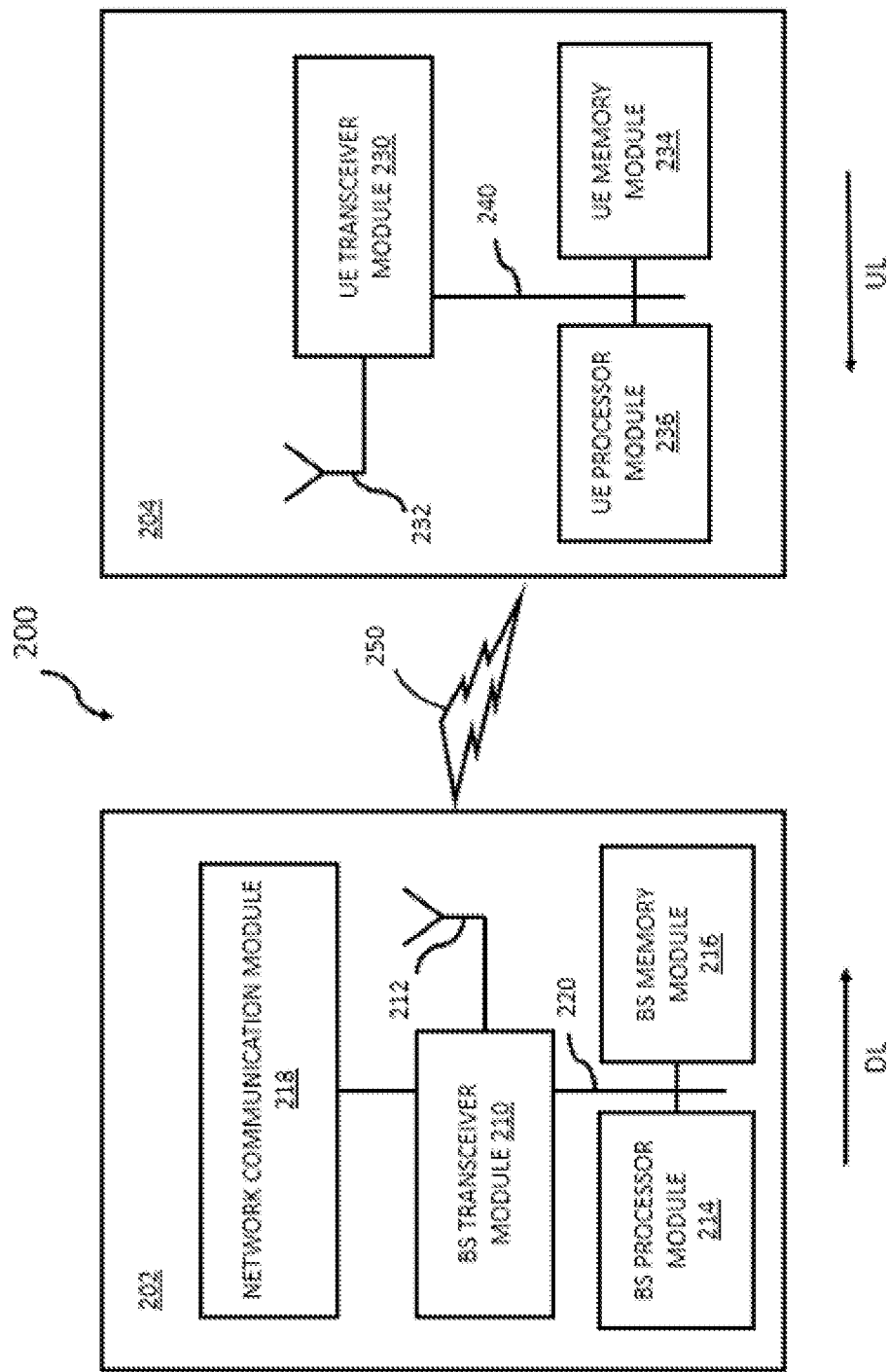
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Indicating PTRS-DMRS Association Information

In certain systems (e.g., wireless communication systems and/or other systems), a wireless communication device (e.g., a UE, a terminal, and/or a served node) may send/transmit/broadcast an uplink (UL) transmission (e.g., physical uplink shared channel (PUSCH) transmissions and/or other transmissions) to one or more transmission/reception points (TRPs) during a multi-TRP (MTRP) uplink transmission. At least one scheduling grant (e.g., downlink control information (DCI) and/or a configured grant) and/or higher layer signaling (e.g., radio resource control (RRC) signaling and/or other types of signaling) can be transmitted from the network (e.g., from a gNB) to the wireless communication device, and can used to indicate/provide/specify/identify a configuration of the MTRP (e.g., configuration for preparing for and/or performing PUSCH transmissions from an UE to a plurality of TRPs). In certain UL transmissions, such as PUSCH transmissions, at least one DCI may indicate/provide/specify an association/relationship between a phase tracking reference signal (PTRS) port and/or a demodulation reference signal (DMRS) port. The PTRS may support/assist/aid the DMRS with accurate configuration of one or more PUSCH transmissions occurring within a short/reduced time interval. In some embodiments, a wireless communication device may send/transmit/broadcast PUSCH (or other UL channels) transmission repetitions to one or more wireless communication nodes (e.g., a ground terminal, a base station, a gNB, an eNB, a TRP, or a serving node). If one or more wireless communication nodes receive the PUSCH transmission repetitions, one or more PTRS ports can be associated/related/linked to one or more DMRS ports. In certain systems, DCI may be currently unable to indicate/provide/specify such PTRS-DMRS association for PUSCH transmissions (e.g., to one or more TRPs or wireless communication nodes or TRPs), since for instance, the DCI may use (or only have) 2 bits for a single TRP.

Figure 3:
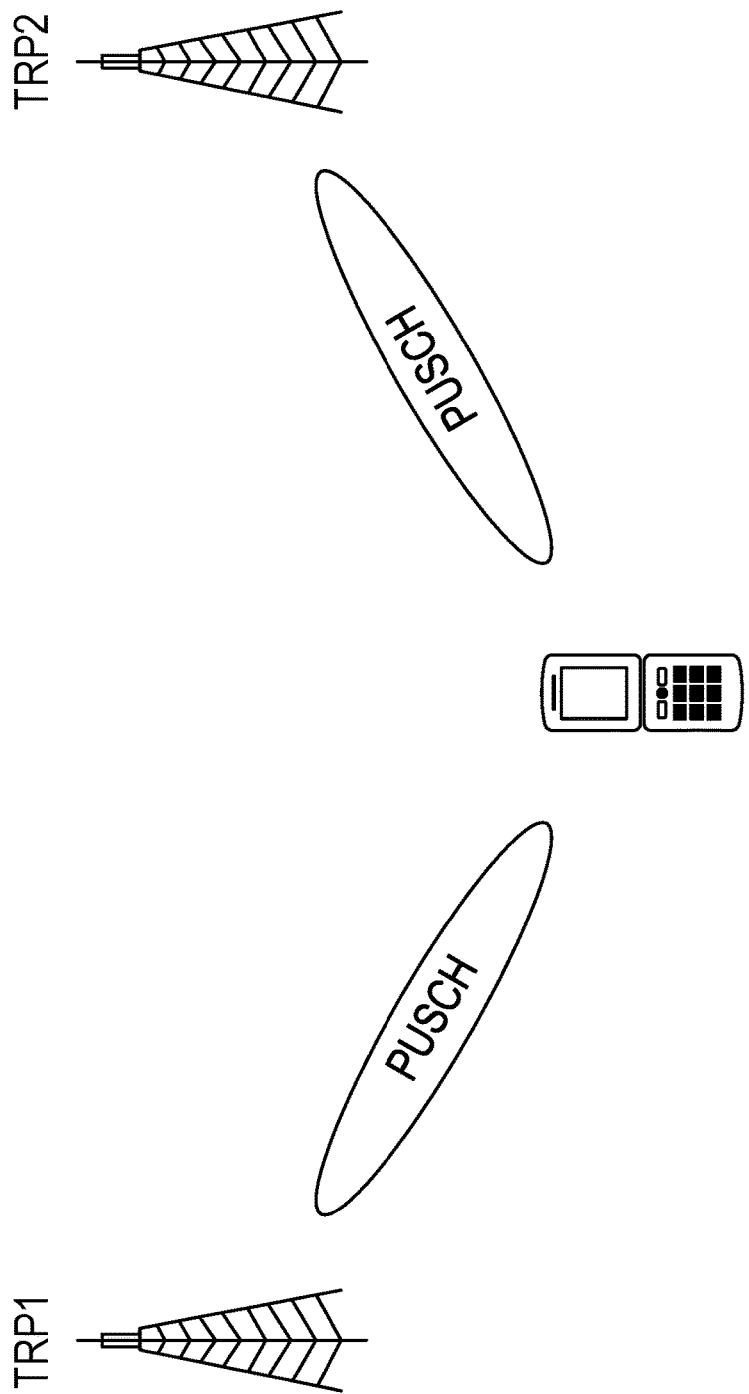
FIG. 3 illustrates example approaches for MTRP PUSCH repetition transmissions, in accordance with some embodiments of the present disclosure.

In certain UL transmissions, at least one sounding reference signal (SRS) resource set may be configured for at least one PUSCH transmission (or other transmissions). Referring now to FIG. 3, depicted is an example approach 300 for MTRP PUSCH repetition transmissions. For codebook based transmissions and/or non-codebook based transmissions, a SRS resource indicator (SRI) and/or transmission precoding matrix indicator (TPMI) of a DCI may indicate/specify/provide a SRS resource and/or a precoder for UL transmissions, to the wireless communication device (e.g., UE). The wireless communication device may transmit/ send/broadcast an indication of at least two PUSCH transmission occasions to one or more wireless communication nodes, such as one or more TRPs (e.g., TRP1 and/or TRP2), for supporting transmissions of a same PUSCH. Therefore, at least two PUSCH transmission occasion groups transmitted to at least two different TRPs (e.g., TRP1 and/or TRP2) may be associated/related to at least two SRS resource sets, or at least two SRS resources, etc. For PUSCH transmissions (or other transmissions), DCI signaling (or other types of signaling, such as higher layer parameter signaling or configured grant signaling) may indicate/provide/specify the association/relationship between the PTRS and the DMRS. In a codebook based transmission, for example, the TPMI of the DCI can be used to indicate/identify the rank (e.g., number of layers, sometimes referred to as layer number), the SRS resource for each layer, and/or other information.

In some embodiments, full coherent UL transmissions (or other transmissions) may support/use at least one PTRS port. For non-coherent and/or partial coherent UL transmissions, at least two SRS ports (e.g., port0 and/or port2) may share/use a first PTRS port (e.g., port 0 and/or other ports), while another group of at least two SRS ports (e.g., port1 and/or port3) may share/use a second PTRS port (e.g., port1 and/or other ports). The wireless communication device may use the TPMI (or other information) to determine the UL transmission layer and/or SRS port for each layer. In some embodiments, at least two DMRS ports may share/use at least one PTRS port when using a SRS port for the at least two DMRS ports. In such a situation, the DCI (or other information/indicators) may indicate/specify which DMRS port is associated/related/linked/mapped to (or to be used/ monitored with) the PTRS port.

In single-DCI-based MTRP PUSCH transmissions, the DCI may indicate/provide at least two SRI and/or TPMI. The association/relationship between the PTRS and/or the DMRS may be different/distinct for one or more PUSCH transmissions groups (e.g., transmitted to one or more TRPs). If the association between the PTRS and/or the DMRS is different for separate PUSCH transmission groups, the DCI (or other information) may indicate/specify/provide PTRS-DMRS association information for each PUSCH transmission group. The systems and methods presented herein include a novel approach for providing/indicating/ specifying such PTRS-DMRS association information to the wireless communication device without adding/increasing overhead (e.g., without using/adding more bits) in the DCI (or other information).

A. Embodiment 1

In some embodiments, the wireless communication device may transmit/send/broadcast at least one PUSCH transmission occasion group of one or more PUSCH transmission occasion groups to a separate/distinct wireless communication node, such as a TRP. The PTRS-DMRS association information of the one or more PUSCH transmission occasion groups and/or each PUSCH transmission occasion group may be associated/related/linked with at least one of: a SRS resource set, a SRS resource, a spatial relation, a transmission configuration indication (TCI) state, a frequency hop quasi co-location (QCL) information and/or a set of power control parameter(s). The following embodiments about different PUSCH transmission occasion groups associated with different SRS resource set is just for example, and are not limited to different SRS resource sets, and can be associated with at least one of: a SRS resource set, a SRS resource, a spatial relation, a transmission configuration indication (TCI) state, a frequency hop quasi co-location (QCL) information and/or a set of power control parameter. For example, a PUSCH transmission occasion group transmitted to a TRP may be associated with a SRS resource set and/or a spatial relation. A PTRS-DMRS association field of the DCI (or other fields of the DCI) may indicate/specify/identify the association between at least one PTRS port and at least one DMRS port for one or more PUSCH transmission occasion groups. The PTRS-DMRS association field (which can be any form of indication) of the DCI may include/provide/specify/indicate SRS resource set information (or other information). The entry/field (e.g., indication, description, or data/information field) of the PTRS-DMRS association of the DCI may indicate the association/relationship between the PTRS and DMRS ports of a PUSCH transmission or group of PUSCH transmissions. The PUSCH transmissions (or one or more groups of PUSCH transmissions) may be associated with one or more SRS resource sets, one or more SRS resources, etc. In some embodiments, the PTRS-DMRS association field may include or correspond to one or more bits of the DCI. For example, one or more bits of the DCI (e.g., reused or repurposed from one or more fields) may be combined/used to configure/generate the PTRS-DMRS association field.

For one repetition (or transmission) of PUSCH, each PUSCH frequency hop is associated to/with one PUSCH transmission occasion group.

For codebook based PUSCH transmissions (or other transmissions), at least two PUSCH transmission occasion groups can be supported. If at least two PUSCH transmission occasion groups are supported, the wireless communication device may send/transmit a PUSCH to one or more TRPs by using different/separate/distinct PUSCH transmission occasion groups. For example, each PUSCH transmission occasion group may be transmitted to a same TRP, wherein each PUSCH transmission occasion group comprises a plurality of PUSCH transmission occasions. The PUSCH transmission occasions of a PUSCH transmission occasion group may be associated/related/linked with at least one of: a SRS resource set, a SRS resource, a spatial relation, a transmission configuration indication (TCI) state, a frequency hop quasi co-location (QCL) information and/or a set of power control parameter.

In some embodiments, PUSCH transmissions may support up to four layers (e.g., rank 1 to rank 4). For a rank 1 PUSCH transmission, at least one DMRS may be configured for each PUSCH transmission occasion. Therefore, an indication of an association between the PTRS and the DMRS may be unnecessary. For a rank 2 PUSCH transmission (e.g., PUSCH occasion 1 and/or PUSCH occasion 2), the TPMI (or other fields) may indicate/provide/specify at least two PTRS ports. The at least two PTRS ports may be associated to at least two DMRS ports. If up to one PTRS port is supported, the at least two DMRS ports may share/use a same PTRS port. An indication of which DMRS port of the at least two DMRS ports is associated to the PTRS port can be specified at a certain time instance. In some embodiments, at least one bit can be used to indicate/specify/inform the association between the PTRS and the DMRS for each PUSCH transmission occasion group and/or SRS resource set (e.g., SRS resource set 1 and/or SRS resource set 2). For example, if one PTRS and/or two DMRS ports are indicated, one bit may be used to specify the association between the PTRS and the DMRS. In some embodiments, a bit value of 0 may indicate/specify/correspond to DMRS port 0, while a bit value of 1 may indicate/correspond to DMRS port 1.

Figure 4:
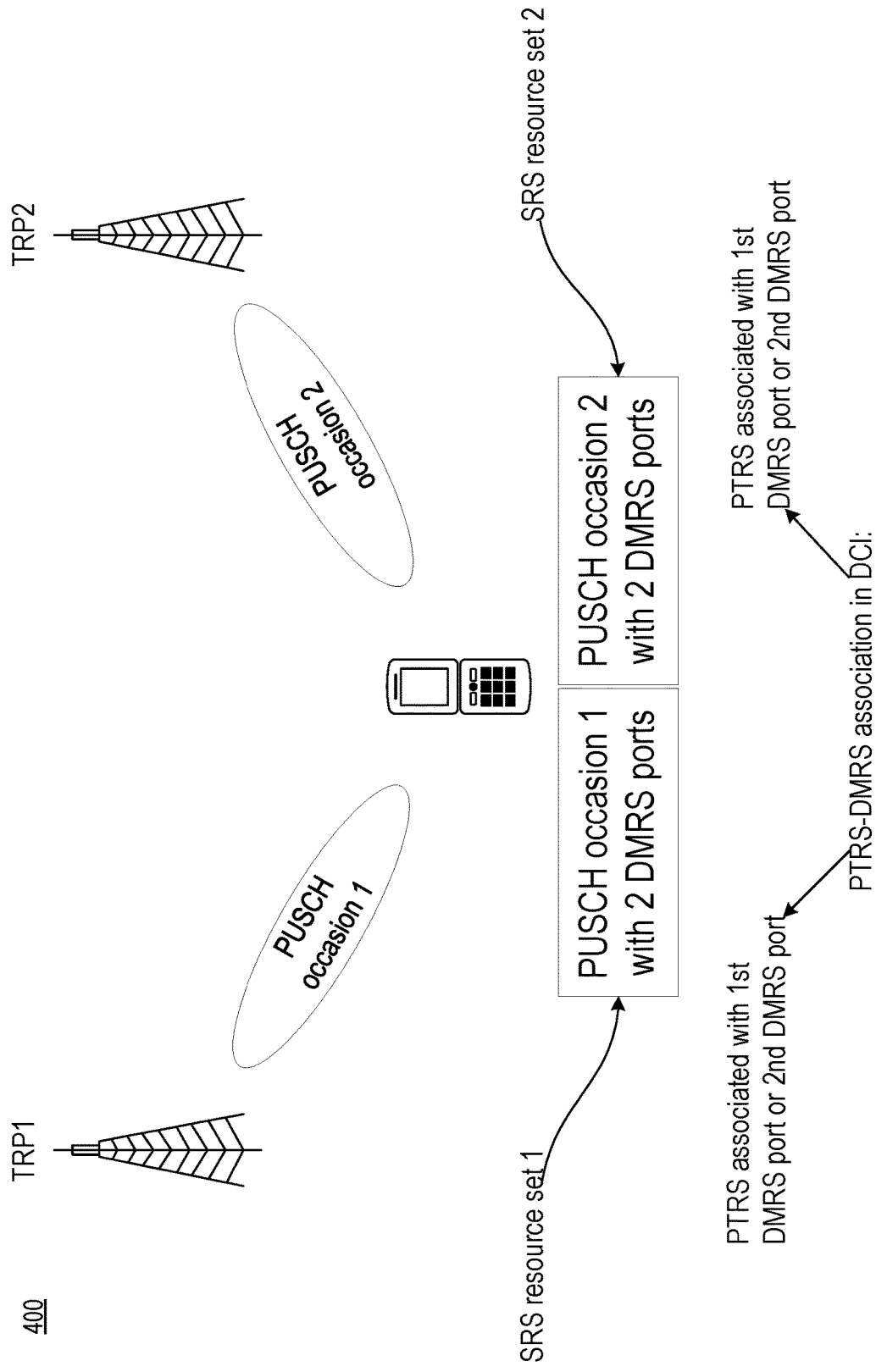
FIG. 4 illustrates example PTRS-DMRS associations for one or more wireless communication nodes, in accordance with some embodiments of the present disclosure.

Referring now to FIG. 4, depicted is an example PTRS-DMRS association 400 for one or more wireless communication nodes, such as one or more TRPs. In MTRP PUSCH repetition transmissions, at least two PUSCH transmission occasion groups (e.g., PUSCH occasion 1 and/or PUSCH occasion 2) can be configured for each TRP (e.g., TRP1 and/or TRP2). At least two SRS resource sets (e.g., SRS resource set 1 and/or SRS resource set 2) may be associated/related to the at least two PUSCH transmission occasion groups. Therefore, at least 2 bits (e.g., 2 bits corresponding to the PTRS-DMRS association field) may indicate/specify the association between the PTRS and the DMRS for rank 2 PUSCH transmissions with one PTRS port. In some embodiments, PUSCH transmissions may be configured for PUSCH repetition. In some embodiments, the TPMI indication, the SRI indication and/or other indications for the first PUSCH transmission may specify/indicate a transmission layer of 2 (or other values).

Referring now to FIG. 5, depicted is an example approach/configuration 500 for using at least two bits (e.g., two bits of the DCI) to indicate the association/relationship between the PTRS and the DMRS (e.g., PTRS-DMRS association information). For codebook based PUSCH transmissions, at least two bits of the TPMI (or other indicators of the DCI) may specify/provide the PTRS-DMRS association information. For non-codebook based PUSCH transmissions, at least two bits of the SRI (or other indicators of the DCI) may indicate the PTRS-DMRS association information. According to some embodiments, FIG. 5 illustrates the PTRS-DMRS association for UL PTRS port 0. For example, the at least two bits of the TPMI/SRI (e.g., the PTRS-DMRS association field) may be used to indicate/specify a value of 0 (or other values). If the PTRS-DMRS association field has a value of 0, PTRS port 0 (or other ports) may be associated to the first DMRS port of the PUSCH transmission occasion group associated with the first and/or second SRS resource set. For example, for TRP1, if the PTRS-DMRS association field has a value of 0, PTRS port 0 may be associated to the first DMRS port of the PUSCH transmission occasion group associated with the first SRS resource set (e.g., the first PUSCH transmission occasion group). For TRP2, for example, the first DMRS port of the PUSCH transmission occasion group associated with the second SRS resource set (e.g., the second PUSCH transmission occasion group) may be associated to PTRS port 0 (e.g., if the PTRS-DMRS association field has a value of 0). Other values of the PTRS-DMRS association field (e.g., values from 1 to 3) may indicate/specify the associations described in FIG. 5.

Referring now to FIG. 6, depicted is an example approach/configuration 600 for using at least two bits (e.g., two bits of the DCI) to indicate the PTRS-DMRS association information. FIG. 6 illustrates the PTRS-DMRS association for UL PTRS port 0. In some embodiments, each bit of the at least two bits (e.g., the most significant bit (MSB) and/or the least significant bit (LSB)) can be used to indicate/provide/specify the association of the PTRS port and the DMRS port. The DMRS port may be associated/related to at least one SRS resource set. For example, at least one bit of the at least two bits (e.g., MSB and/or LSB) of the PTRS-DMRS association field may indicate that the PTRS port is associated to the first and/or second DMRS port for the first PUSCH transmission occasion group. The other bit(s) of the at least two bits may specify that the PTRS port is associated to the first and/or second DMRS port for the first PUSCH transmission occasion group. In some embodiments, additional bits can be used to indicate the association between the PTRS port and the DMRS port (e.g., for transmissions of more than two layers) for one PUSCH transmission occasion group. Therefore, the PTRS-DMRS association for one PUSCH transmission occasion (e.g., the first PUSCH transmission occasion group) can be indicated in the PTRS-DMRS association field (e.g., the at least two bits are used).

B. Embodiment 2

Referring now to FIG. 7, depicted is an example approach/configuration for using at least three values or at least one bit to indicate the PTRS-DMRS association information. In some embodiments, one or more DMRS port indications can be used to specify/indicate/provide the association between the PTRS port and the DMRS port for at least one PUSCH transmission occasion group. An antenna port indication field (e.g., in DCI) may be used to indicate/specify one or more DMRS ports. The antenna port indication field (sometimes referred as an antenna port indication field for DMRS, or a DMRS port field) may also be used to indicate the PTRS-DMRS association information. For rank 3 and/or rank 4 MTRP PUSCH transmissions, at least 3 bits (e.g., eight values) of the DCI can be used to indicate the DMRS port (e.g., values 0, 1, and/or 2 may indicate DMRS ports 0, 1, and/or 2). At least one entry/value of the values generated with the at least 3 bits may indicate the DMRS port, while the other values may be reserved for other use cases.

The association between the DMRS port and the PTRS port can be specified for at least two PUSCH transmission occasion groups. For example, existing indication information of the DCI (e.g., at least two bits of the PTRS-DMRS association field) can be used to specify/provide the PTRS-DMRS association information of a first PUSCH transmission occasion group. The first PUSCH transmission occasion group may include or correspond to the PUSCH occasion group associated with a first SRS resource set. A reserved/predefined bit of the DMRS port field of the DCI may be used (e.g., reused/repurposed) to specify the PTRS-DMRS association information of a second PUSCH transmission occasion group. The second PUSCH transmission occasion group may include or correspond to the PUSCH occasion group associated with a second SRS resource set.

The fourth column (from left to right) of the table 700 of FIG. 7 may provide/specify the association between a single PTRS port (e.g., PTRS port 0) and a DMRS port (e.g., 1st scheduled DMRS port, $2^{nd}$ scheduled DMRS port, and/or 3rd scheduled DMRS ports) for the second PUSCH transmission occasion group. For example, for a scenario with a single PTRS port, a value of 0 may indicate that a $1^{st}$ scheduled DMRS port is associated with PTRS port 0 for the second PUSCH transmission occasion group. The fifth column (from left to right) of the table 700 of FIG. 7 may specify the association between one or more PTRS ports (e.g., a shared PTRS port) and a DMRS port for the second PUSCH transmission occasion group. For example, for a scenario with one or more PTRS ports, a value of 1 may indicate that a $2^{nd}$ DMRS port is associated with a shared PTRS port (e.g., a PTRS port shared by the two DMRS ports) for the second PUSCH transmission occasion group.

According to FIG. 7, DMRS port indication values of 0, 1, and/or 2 may indicate the same DMRS port(s) (e.g., DMRS ports 0, 1, and/or 2). In some embodiments, DMRS port indication values of 0, 1, and/or 2 may indicate/specify the PTRS-DMRS association information of the second PUSCH transmission occasion group (e.g., by using the information of the third and fourth columns of table 700). If at least one PTRS port (e.g., PTRS port 0) is configured/indicated (e.g., full coherent transmission for codebook based transmission and/or using the SRI indication for non-codebook based transmission), at least three DMRS ports may use the configured/indicated PTRS port. Therefore, DMRS port indication values of 0, 1, and/or 2 may indicate which DMRS port (e.g., $1^{st}$ scheduled DMRS port, $2^{nd}$ scheduled DMRS port, and/or $3^{rd}$ scheduled DMRS port) is associated with the PTRS port (e.g., PTRS port 0). For example, a value of 2 may specify the scheduled DMRS ports correspond to ports 0-2. Furthermore, a value of 2 may indicate the PTRS (e.g., PTRS port 0) is associated with the $3^{rd}$ scheduled DMRS port.

In some embodiments, at least two PTRS ports can be configured and/or indicated. If at least two PTRS ports are configured, the two DMRS ports may share/use at least one PTRS port. The entry/field of DMRS port indication may specify the PTRS-DMRS association information. For example, two DMRS ports may share/use a first PTRS port. Therefore, two values of the DMRS port indication may specify the PTRS-DMRS association information. For instance, a value of 0 (or other values) may indicate that a PTRS port is associated with a first DMRS port which shares the PTRS port with a second DMRS port. A value of 1, for example, may specify that the PTRS port is associated with a second DMRS port which shares the PTRS port with a first DMRS port.

Referring now to FIG. 8, depicted is an example approach/configuration for indicating the PTRS-DMRS association information for rank 4 PUSCH transmissions. In some embodiments, DMRS port indication values of 0, 1, 2 and/or 3 may indicate one or more DMRS ports, such as the same DMRS ports (e.g., DMRS ports 0-3). In a similar manner to the table 700 of FIG. 7, the DMRS port indication values can be used to specify the PTRS-DMRS association information of the PUSCH transmission occasions associated with the second SRS resource set. In some embodiments, at least one PTRS port may be configured/indicated. If only one PTRS port (e.g., PTRS port 0) is configured, at least four DMRS ports may share/use the configured PTRS port. The DMRS port indication values of 0, 1, 2, and/or 3 may specify which DMRS port (e.g., $1^{st}$ scheduled DMRS port, $2^{nd}$ scheduled DMRS port, $3^{rd}$ scheduled DMRS port, and/or $4^{th}$ scheduled DMRS port) is associated with the PTRS port (e.g., PTRS port 0). If at least two PTRS ports are configured/indicated, each PTRS port of one or more PTRS ports may be associated with at least two DMRS ports. Therefore, at least two values of the DMRS port indication values (e.g., values 0, 1, and/or other values) may indicate that a first and/or second DMRS port is associated with a first PTRS port (e.g., PTRS port 0). Furthermore, at least two values of the DMRS port indication values (e.g., values 2, 3, and/or other values) may indicate that the first and/or second DMRS port is associated with a second PTRS port (e.g., PTRS port 1). The fourth and fifth columns (from left to right) of table 800 describe one or more approaches for indicating the PTRS-DMRS association information (e.g., the association between the first and/or second PTRS/DMRS ports) according to the DMRS port indication values.

The indication of type 2 DMRS ports can be different/distinct from the indication of type 1 DMRS ports. For rank 3 PUSCH transmissions, a type 2 DMRS port indication may use at least three values (e.g., values of 0, 1, and/or 2) to indicate DMRS port(s). Therefore, at least 13 values of the type 2 DMRS port indication values (e.g., values 3 to 15) may be unused for DMRS port indication. In some embodiments, the at least 13 values may be used to indicate/specify the PTRS-DMRS association information of a PUSCH transmission occasion group associated with the second SRS resource set. Referring now to FIG. 9, depicted is an example approach/configuration for indicating the PTRS-DMRS association information using type 2 DMRS. In certain embodiments, type 2 DMRS port indication values of 0-2, 3-5 and/or 6-8 (or other values) may specify the same/corresponding DMRS port(s). For example, DMRS port indication values of 0, 3, and/or 6 may indicate/specify the same DMRS port(s), such as DMRS ports 0-2 (or other values). In another example, DMRS port indication values of 2, 5, and/or 8 may indicate the same/corresponding DMRS port(s), such as DMRS port 3-5. In some embodiments, type 2 DMRS port indication values of 0 through 8 (or other values) may be used to indicate the PTRS-DMRS association information of the second PUSCH transmission occasion group.

For example, at least one PTRS port (e.g., PTRS port 0) may be indicated/configured. If the wireless communication device receives/obtains a type 2 DMRS port indication value of 3, the wireless communication device may determine an associated/corresponding DMRS code division multiplexing (CDM) group number (e.g., 2 or other values) and/or one or more scheduled DMRS ports (e.g., DMRS ports 0 through 2) according to the DMRS port indication value. The DMRS port indication value (e.g., 3 or other values) may specify that the configured PTRS port (e.g., PTRS port 0) is associated to the $2^{nd}$ scheduled DMRS port (e.g., according to the fourth column (from left to right) of table 900). For at least two PTRS ports of rank 3 PUSCH transmissions, two DMRS ports may share/use one PTRS port. Therefore, if the DMRS port indication has a value of 3, the shared PTRS port may be associated with the $2^{nd}$ scheduled DMRS port (e.g., according to the fifth column (from left to right) of table 900).

FIG. 10 depicts another example approach/configuration for indicating the PTRS-DMRS association information using type 2 DMRS. For rank 4 transmissions, if the DMRS type is configured to type 2, the DMRS port indication may be updated/specified/configured as indicated in table 1000 of FIG. 10. In certain embodiments, type 2 DMRS port indication values of 0-1, 2-3, 4-5 and/or 6-7 (or other values) may specify the same/corresponding DMRS port(s). For example, DMRS port indication values of 0, 2, 4, and/or 6 may indicate/specify the same DMRS port(s), such as DMRS ports 0-3 (or other values). In another example, DMRS port indication values 1, 3, 5 and/or 7 may indicate the same/corresponding DMRS port(s), such as DMRS ports 0-3. The DMRS port indications of FIG. 10 may be used/interpreted/analyzed in a manner similar to FIG. 9.

In certain embodiments, a maxLength parameter for type 1 DMRS and/or type 2 DMRS may have a value of 2 (or other values). If the maxLength has a value of 2, the indication of DMRS ports can be different/distinct from the indication of DMRS ports for a same DMRS type and a maxLength value of 1. Referring now to FIG. 11, depicted is an example approach/configuration for indicating the PTRS-DMRS association information for rank 3 transmissions using type 1 DMRS and/or a maxLength value of 2. For instance, according to FIG. 11, an antenna port value (e.g., DMRS port indication) of 4 may indicate/specify one or more DMRS ports, such as DMRS port 0, DMRS port 1, and/or DMRS port 4 (or other ports). In certain embodiments, antenna port values of 0-2, 3-5 and/or 6-8 (or other values) may specify the same/corresponding DMRS port(s). For example, antenna port values of 0, 3, and/or 6 may indicate/specify the same DMRS port(s), such as DMRS ports 0-2 (or other values). In another example, DMRS port indication values 1, 4, and/or 7 may indicate the same/corresponding DMRS port(s), such as DMRS ports 0, 1, and/or 4 (or other values).

In some embodiments, one or more DMRS ports may share/use at least one PTRS port (e.g., PTRS port 0). If the one or more DMRS ports share at least one PTRS port, an antenna port value of 4 may indicate that the PTRS port for the second PUSCH transmission occasion group is associated to a $2^{nd}$ scheduled DMRS port (or other ports). In some embodiments, at least two PTRS ports may be configured/indicated by the TPMI/SRI. If at least two PTRS ports are configured, the DMRS ports may share/use a same PTRS port. For example, an antenna port value of 4 may specify that the shared PTRS port for the second PUSCH transmission occasion group is associated to a $2^{nd}$ DMRS port (e.g., of the one or more DMRS ports) sharing the PTRS port (or other DMRS ports).

FIG. 12 depicts another example approach/configuration for indicating the PTRS-DMRS association information for rank 4 transmissions using type 1 DMRS and/or a maxLength value of 2. The DMRS port indications of FIG. 12 may be used/interpreted/analyzed in a manner similar to FIG. 11. However, according to FIG. 12, the antenna port indication values extend/increase from 0-8 (see FIG. 11) to 0-15. In some embodiments, antenna port values of 0-3, 4-7, 8-11, and/or 12-15 indicate the same DMRS port(s). For example, antenna port values of 0, 4, 8, and/or 12 may indicate/specify the same DMRS ports, such as DMRS ports 0-3 (or other values). In another example, antenna port values 1, 5, 9, and/or 13 may indicate the same/corresponding DMRS ports, such as DMRS ports 0, 1, 4, and/or 5. Each antenna port value may indicate/specify a different/distinct/separate PTRS-DMRS association information for one PTRS port (e.g., PTRS port 0) and/or two PTRS ports (e.g., PTRS port 0 and/or PTRS port 1) of the PUSCH associated to the second SRS resource set. FIGS. 13 and 14 depict various example approaches for indicating the PTRS-DMRS association information for rank 3 and/or rank 4 transmissions using type 2 DMRS and/or a maxLength value of 2. The DMRS port indications of FIGS. 13 and 14 may be used/interpreted/analyzed in a manner similar to FIGS. 11 and 12.

C. Embodiment 3

In some embodiments, the bit information of the DMRS port indication may be used to indicate/provide/specify the PTRS-DMRS association information of the second PUSCH transmission occasion group.

For rank 3 and/or rank 4 PUSCH transmissions, the DMRS may be configured to be type 1 and/or type 2. If the DMRS is configured as type 1, a DMRS port indication value of 0 (or other values) may indicate/specify a scheduled DMRS port. The type 1 DMRS port indication values may support up to 8 (or other numbers) values, and hence, up to 3 bits can be used to indicate the scheduled DMRS. However, at least 1 bit can be used to specify the scheduled DMRS port. If the DMRS is configured as type 2, DMRS port indication values of 0-2 (or other values) may indicate the scheduled DMRS port for rank 3 PUSCH transmissions. For rank 4 PUSCH transmissions, DMRS port indication values of 0 and/or 1 (or other values) may indicate the scheduled DMRS port if the DMRS is configured as type 2. The type 2 DMRS port indication values may support up to 15 (or other numbers) values, and hence, up to 4 bits can be used to indicate the scheduled DMRS. However, at least 1 and/or 2 bits can be used to specify the scheduled DMRS port.

Figure 15:
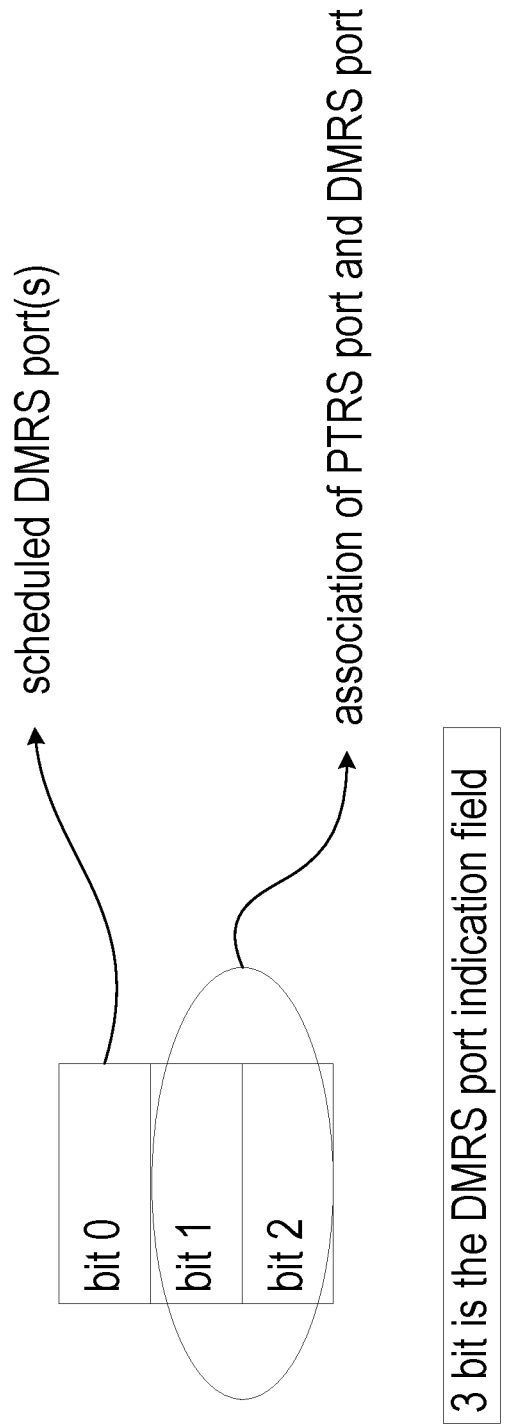
FIG. 15 illustrates example approaches/configurations for indicating the PTRS-DMRS association information for rank 3 and/or rank 4 transmissions using at least 2 bits, in accordance with some embodiments of the present disclosure.

Referring now to FIG. 15, depicted is an example approach/configuration for indicating the PTRS-DMRS association information for rank 3 and/or rank 4 transmissions using at least 2 bits. In some embodiments, the bit information (e.g., at least one bit) of the antenna port field can be used to indicate/specify a DMRS port. The bit information of the antenna port field may be used to indicate the association between the PTRS port and the DMRS port associated with the second SRS resource set. For rank 3 and/or rank 4 transmissions, the bit information can indicate the PTRS-DMRS association information if PUSCH repetition is configured in a MTRP scheme, at least two PUSCH transmission occasion groups are configured/activated, and/or additional SRI/TPMI fields are indicated. The at least two bits, (e.g., the last 2 bits) of the DMRS port indication field may indicate the PTRS-DMRS association information in a manner similar to FIGS. 7 to 10.

If the layer number can indicate the DMRS port, the DMRS port may not be indicated in the antenna field. For example, for type-1 single-symbol DMRS (e.g., maxLength is 1), if the layer number is indicated/configured as 3 or 4, the DMRS ports can be used as port 0-2 for 3 layers and/or 0-3 for 4 layers. In some embodiments, the DMRS port may not be indicated in the antenna field. Therefore, the 1 bit and/or 2 bits of the antenna field can be used to indicate the PTRS-DMRS association of the second PUSCH transmission occasion group.

Similarly, for non-coherent PUSCH transmissions, if the transmission layer is indicated as 3 or 4, one precoding matrix can be used for 3 layers and/or 4 layers respectively. Therefore, the precoding matrix may not be indicated by using the TPMI for the second PUSCH transmission occasion group. The 1 bit and/or 2 bits in the TPMI field for the second PUSCH transmission occasion group can be used to indicate PTRS-DMRS association of the second PUSCH transmission occasion group.

D. Embodiment 4

In some embodiments, the TPMI (or other DCI fields) may indicate/provide/specify the PTRS-DMRS association information of a PUSCH transmission occasion group. The PUSCH transmission occasion group may include or correspond to the PUSCH transmission occasion group.

For codebook based transmissions, the wireless communication device may report/inform/provide/indicate the capability of the wireless communication device to support full coherent, partial coherent, and/or non-coherent transmissions. The first precoding matrix and/or the layer number field may indicate the transmission layer. One or more coherent support capabilities of the wireless communication device may result in one or more bit field sizes of the TPMI. The wireless communication device may report/inform/communicate the capability of the wireless communication device for full coherent, partial coherent, and/or non-coherent transmissions. In some embodiments, up to 64 TPMI values may be indicated if the wireless communication device reports the capability of the wireless communication device for full coherent, partial coherent, and non-coherent transmissions. At least 6 bits may be used to indicate the up to 64 TPMI values and/or layer number. The up to 64 TPMI values may include 28 TPMI values for layer/rank 1, 21 TPMI values for layer/rank 2, 4 TPMI values for layer 3, and/or 7 TPMI values for rank 4. For rank 1 and/or rank 2 transmissions, a first TRP may use at least 6 bits to indicate one or more TPMI values and/or layer number. The second TRP may use at least 5 bits to indicate one or more TPMI values and/or layer number. If the wireless communication device supports partial and/or non-coherent transmissions, up to 32 TPMI values may be indicated. If the wireless communication device supports non-coherent transmissions, up to 16 TPMI values may be indicated.

To save/reduce/decrease overhead DCI signaling, the indication field of precoding and/or the layer used for PUSCH transmission to the second TRP can be reduced. In some embodiments, PUSCH transmission repetitions to one or more TRPs may use a same layer. The layer number may be indicated by the TPMI field and/or the SRI field for the first PUSCH transmission group. For rank 1 transmissions, the TPMI may be selected/determined/configured from up to 28 TPMI values. For rank 2 transmissions, the TPMI may be selected/determined/configured from up to 21 TPMI values. Up to 5 bits can be used to specify the TPMI indication of the PUSCH transmission to the second TRP. For rank 3 and/or rank 4 transmissions, the TPMI may be selected from up to 7 and/or 5 TPMI values respectively. Up to 3 bits can be used to specify the TPMI indication of the PUSCH transmission to the second TRP.

For the 4 antenna port transmissions, a wireless communication device supporting all types of coherent transmissions may use up to 5 bits to specify the TPMI indication. Regardless of the coherent mode of the PUSCH transmissions, if the wireless communication device supports all types of coherent transmissions, up to 5 bits may be used for the second PUSCH transmission occasion group (e.g., to preserve the ability to indicate any of the TPMI values). However, up to 3 bits can be used to indicate the TPMI if the layer number has a value of 3 and/or 4 (or other values). The two remaining bits of the up to 5 bits may be reserved for other use cases. For instance, the two remaining bits can be used to indicate the PTRS-DMRS association information (e.g., the last 2 bits).

Referring now to FIG. 16, depicted is an example approach/configuration for indicating the PTRS-DMRS association information using the TPMI indication. For rank 3 transmissions, for example, the original precoding matrix table includes seven original precoding matrices corresponding to seven TPMI values. Therefore, up to 3 bits can indicate/identify the precoding matrix to be used. Table 1600 of FIG. 16 illustrates that the original table may be extended to include up to 28 precoding matrices. The additional 21 precoding matrices (indicated by symbols *, , * in FIG. 16) may be copied/replicated from the original precoding matrix. Therefore, TPMI values 7-13, 14-20, and/or 21-27 may include or correspond to TPMI values 0-7.

In some embodiments, the same precoding matrix with different/distinct/separate TPMI index may identify/indicate the PTRS-DMRS association information. The PTRS-DMRS association field of the DCI may indicate/specify the PTRS-DMRS association information of the PUSCH transmission occasion groups transmitted to a first TRP (e.g., associated to a first SRS resource set). By extending the original TPMI table, the PTRS-DMRS association information of the PUSCH transmission occasion groups transmitted to a second TRP (e.g., associated to a second SRS resource set) may be indicated. For example, according to table 1600 of FIG. 16, TPMI values of 0-6, 7-13, 14-20 and/or 21-27 may specify/provide the PTRS-DMRS association information using bit values '00', '01', '10', and/or '11' respectively. If the PUSCH transmission is full coherent and/or one PTRS port is configured, the bit values of '00',
'01', '10', and/or '11' may indicate a PTRS-DMRS association. For example, the bit values of '00', '01', '10', and/or '11' may indicate the PTRS port is associated with a first, second, third, and/or fourth DMRS port respectively. If up to three DMRS ports are supported, the TPMI values of 21-27 may be unused. If at least two PTRS ports are indicated by the TPMI (e.g., the PUSCH is a non-coherent and/or partially coherent transmission in rank 3 transmission), TPMI values of 0-6, 7-13, 14-20, and/or 21-27 may indicate/specify the PTRS-DMRS association by using bit values '00', '01', '10', and/or '11' respectively. The '00', '01', '10', and/or '11' bit values may indicate/identify the PTRS-DMRS association information.

Referring now to FIG. 17, depicted is an example approach/configuration for indicating the PTRS-DMRS association information for rank 4 transmissions using the TPMI indication. The TPMI indication/index of FIG. 17 may be used/interpreted/analyzed in a manner similar to FIG. 16. For example, TPMI values 0-4 (from five precoding matrices) may indicate/specify/provide the original precoding matrix. The precoding matrices may be extended/replicated by using TPMI values 0-19. The additional 15 precoding matrices (indicated by symbols *, , * in FIG. 17), indicated by TPMI values 5-19, may be extracted/copied/replicated from the original five precoding matrices (e.g., TPMI values 0-4). Therefore, the precoding matrices of TPMI values 5-9, 10-14, and/or 15-19 may include or correspond to the precoding matrices of TPMI values 0-4. One or more bit values, such as values '00', '01', '10', and/or '11', can indicate/specify the PTRS-DMRS association information. The bit values '00', '01', '10', and/or '11' may identify the PTRS-DMRS association information for one or more PUSCH transmissions to a second TRP. The PTRS-DMRS association field of the DCI may use bit values '00', '01', '10', and/or '11' to indicate/specify/provide the PTRS-DMRS association information of one or more PUSCH transmissions to a first TRP. The PTRS-DMRS association field may use bit values '00', '01', '10', and/or '11' to indicate the association information of a PUSCH transmission occasion group of a first TRP to the wireless communication device.

For rank 2 transmissions, the TPMI indication may use up to 5 bits for the PUSCH transmission occasions associated with the second SRS resource set. Therefore, no additional/extra bit(s) of the TPMI indication may be used/available/accessible to indicate/identify the PTRS-DMRS association information. If there are no additional/extra bit(s), the steps/operations described in connection with FIGS. 5 and 6 can be used to indicate/provide the PTRS-DMRS association information.

The PUSCH repetition scheme in MTRP transmissions may cause the wireless communication device to transmit/send/broadcast a PUSCH repetition on different/separate PUSCH occasions to one or more TRPs. One or more TRPs may receive/obtain one or more PUSCH transmission occasion groups with a same coherent capability. In some embodiments, the DCI may indicate/specify/configure at least two TPMI fields. A first TPMI field may be associated with the first transmission group. The first TPMI field can use the existing TPMI indication mode to specify that coherent transmission (e.g., full coherent transmission and/or other coherent transmissions) is used for the PUSCH occasion. Therefore, a second TPMI field may indicate a precoding matrix of the full coherent transmission precoding matrices. In some embodiments, the index for the precoding information and/or the field for the number of layers may specify that the transmission layer has a value of 3 (or other values). The TPMI field may indicate/specify that the precoding matrix is full coherent. Therefore, the other TPMI can be used for indicating the PUSCH transmission occasion groups associated with the second SRS resource set. The other TPMI can be chosen/selected/identified/determined from the group of layer 3 and/or full coherent transmission.

If a same coherent mode is used for at least two PUSCH transmission occasion groups, the TPMI used for the second PUSCH transmission occasion group can be reduced/decreased. The precoding information and/or layer number field may indicate/specify/identify the number of layers and/or the TPMI in the corresponding precoding matrix table. Assuming the same layer number and/or coherent mode would apply for the at least two PUSCH transmission occasion groups to one or more TRPs, the precoding matrix of the second PUSCH occasion group (e.g., associated with the second SRS resource set) may be reduced to a lower level (e.g., compared to a case that does not need to use the same coherent mode).

For rank 2 transmissions, for example, the precoding information and/or layer number field of the DCI may indicate/specify a full coherent mode. If the coherent mode is the same for one or more PUSCH transmissions to distinct/separate TRPs, the number of elements of the precoding matrix table can be reduced to at least 8 (or other values). At least three bits can identify/specify the TPMI of the PUSCH transmissions to the second TRP. The reserved/additional bit can be used to provide the PTRS-DMRS association information. Referring now to FIG. 18, depicted is an example approach/configuration for indicating the PTRS-DMRS association information for rank 2 transmissions using the TPMI indication. According to table 1800 of FIG. 18, one or more precoding matrices (e.g., all precoding matrices) can be full coherent. One or more TPMI values, such as values 0-7 (or other values), may indicate/represent/specify the original precoding matrix. Other TPMI values, for example values 8-15, may specify precoding matrices that include or correspond to the original precoding matrix.

E. Embodiment 5

If partial coherent and/or non-coherent transmissions are supported, up to 32 TPMI values may be used to indicate the precoding matrix and/or the layer number according to the capability of the wireless communication device. Therefore, at least 5 bits may specify/identify the TPMI and/or layer number of the PUSCH associated to the first SRS resource set. The up to 32 TPMI values may include 12 TPMI values for layer/rank 1, 14 TPMI values for layer/rank 2, 3 TPMI values for layer 3, and/or 3 TPMI values for rank 4. The size of the TPMI field associated to the second SRS resource set can be the same size as the TPMI field associated to the first SRS resource set (e.g., at least 5 bits). In some embodiments, the size of the TPMI field associated to the second SRS resource set may be the same size as one or more TPMI values of different layer numbers (e.g., the size of TPMI for layer 2). For example, for layer 2 PUSCH transmissions, at least four bits can be used to indicate the TPMI of the PUSCH associated to the second SRS resource set (e.g., 14 TPMI values). For layer 3 and/or layer 4 PUSCH transmissions, at least three values can be used to indicate the TPMI (e.g., at least two bits). The other/additional/extra/unused bits (e.g., at least two bits) can be used to specify the PTRS-DMRS association information.

Referring now to FIG. 19, depicted is an example approach/configuration for indicating the PTRS-DMRS association information for rank 3 transmissions using the TPMI indication. According to table 1900 of FIG. 19, TPMI values 3-5 and/or 6-8 may specify the same precoding matrices as TPMI values 0-2 for layer 3 PUSCH transmissions. The same precoding matrix with a separate/distinct/different TPMI may indicate the PTRS-DMRS association information of the PTRS port and the DMRS port associated to the second SRS resource set. If at least one PTRS port is configured, the same precoding matrix with at least three distinct TPMI values may specify the association between the PTRS port and the $1^{st}$ DMRS port, the $2^{nd}$ DMRS port, and/or the $3^{rd}$ DMRS port. If at least two PTRS ports are configured, a first DMRS port may be associated to a first PTRS port. Furthermore, a second DMRS port and/or a third DMRS port may share/use a second PTRS port. Therefore, a same precoding matrix with one or more TPMI values may indicate/specify/identify the PTRS port associated to the DMRS port sharing/using the PTRS port with another DMRS port.

Referring now to FIG. 20, depicted is an example approach/configuration for indicating the PTRS-DMRS association information for rank 4 transmissions using the TPMI indication. According to table 2000 of FIG. 20, the precoding matrices of TPMI values 3-5, 6-8, and/or 9-11 may include or correspond to the precoding matrices of TPMI values 0-2. The same precoding matrix with different/distinct TPMI can indicate/specify the association between a PTRS port and a DMRS port associated to the second SRS resource set. If at least one PTRS port is configured, the same precoding matrix with at least four distinct TPMI values may specify the association between the PTRS port and the $1^{st}$ DMRS port, the $2^{nd}$ DMRS port, the $3^{rd}$ DMRS port, and/or the $4^{th}$ DMRS port. If at least two PTRS ports are configured, at least two DMRS ports may share/use at least one PTRS port. The same precoding matrix with distinct TPMI values may specify the PTRS port associated to the DMRS port which shares the PTRS port with another DMRS port.

In some embodiments, the wireless communication device may support non-coherent PUSCH transmissions. Up to 12 TPMI values (e.g., at least 4 bits) may be used to indicate the precoding matrix and/or the layer number. The up to 12 TPMI values may include 4 TPMI values for layer/rank 1, 6 TPMI values for layer/rank 2, 1 TPMI value for layer 3, and/or 1 TPMI value for rank 4. The TPMI field may use up to 4 bits to indicate the layer number and/or precoding matrix of the PUSCH transmission associated to the first SRS resource set. In some embodiments, at least 4 bits may be used to indicate the layer number and/or precoding matrix of the PUSCH transmission associated to the second SRS resource set. In some embodiments, less than four bits can be used to specify the precoding matrix for the PUSCH transmission to the second TRP. The layer number of the PUSCH transmission to the second TRP may correspond to the layer number of the PUSCH transmission to the first TRP. For four SRS resources with non-coherent PUSCH transmissions, the maximum number of precoding matrices may correspond to six with 2 layer transmissions. Therefore, at least three bits can be used for the TPMI index of the PUSCH of the second PUSCH transmission occasion group. For rank 3 and/or rank 4 transmissions, one precoding matrix may be supported. The precoding matrix can be copied/expanded/extended to include 3 and/or 4 precoding matrix values. One or more TPMI values for the same precoding matrix may specify one or more associations between the PTRS port and the DMRS port (e.g., similar to FIGS. 19 and 20).

F. Embodiment 6

In some embodiments, the SRI field may indicate/identify/provide/specify the PTRS-DMRS association of the PUSCH transmission occasion group associated with the second SRS resource set.

For non-codebook based PUSCH transmissions, the SRI may indicate a SRS resource for a PUSCH transmission and/or a layer number (which refers to the number of layers). For example, each SRS resource of four SRS resources may include at least one SRS port. For non-codebook based transmissions, each SRS resource may be associated to one layer. The DCI may indicate the SRI by using at least four bits when the maximum layer number is four. If the SRI has a value of 10, the SRI may specify SRS resources 0, 1, and/or 2 for the PUSCH transmission and/or layer number 3. In a MTRP PUSCH repetition scheme, the SRI of the PUSCH transmission occasion group associated to the second SRS resource set may be indicated. If the wireless communication device (e.g., UE) transmits PUSCH to the different TRPs using the same layer number, the number of SRS resources indicated to the second PUSCH occasion group may correspond to the number of SRS resources indicated to the first PUSCH occasion group. For example, if the SRI indicates at least three layers for the first PUSCH occasion group, the SRI indicated to the second PUSCH occasion group may indicate at least three SRS resources.

Referring now to FIG. 21, depicted is an example approach/configuration for indicating the PTRS-DMRS association information using the SRI of the DCI. According to table 2100 of FIG. 21, at least four values can be used to indicate the three SRS resources, for example, values 10-13. Therefore, values 10-13 (or other values) are candidate values for indicating/specifying at least three SRS resources. For three SRS resources, values 4-7 and/or values 8-11 may indicate the same SRS resources as values 0-3. Therefore, values 0-3, 4-7 and/or 8-11 can be used to specify different/distinct/separate associations between the PTRS port and the DMRS port. Four SRS resources may be indicated in a similar manner to three SRS resources. In some embodiments, four SRS resources and/or three SRS resources may be indicated using distinct/separate tables. For example, a table for four SRS resources may be different from table 2100 in that four SRS resources can be indicated using values 0-3 instead of values 12-15, as shown in FIG. 22.

In some embodiments, the bit information of the SRI indication can be used to specify the PTRS-DMRS association information of the PUSCH transmission occasion group associated with the second SRS resource set.

In some embodiments, the maximum layer number and/or the number of SRS resources may correspond to a value 4, as shown in FIG. 18. If three and/or four SRS resources are indicated, at least four values (e.g., values 10-13) and/or one value (e.g., value 14) may be used for the respective SRS resources. Therefore, at least two bits can be used to indicate/provide/specify the three SRS resources, while at least one bit may be used to indicate the four SRS resources. The SRI indication field may support/use at least four bits of the DCI. Therefore, the remaining two or three bits can be used to indicate the PTRS-DMRS association information. The last one or two bits of the SRI field can be used to indicate the PTRS-DMRS association. The bits for the PTRS-DMRS association information may be indicated in a manner similar to the indication of the PTRS-DMRS association field of the DCI.

In some embodiments, the maximum layer number and/or the number of SRS resources may be less than four (or other values). In such a case, another approach/configuration with different/distinct bit numbers for the SRI indication can be used. Referring now to FIG. 23, depicted is another example approach/configuration for indicating the PTRS-DMRS association information using the SRI of the DCI. For a maximum layer number of 3 and/or 4 and at least 3 SRS resources, at least three bits may be used to indicate the SRS resource. For layer 3 transmissions, however, at least one value can be used to specify the SRS resource. Therefore, as shown in table 2300 of FIG. 23, at least two bits may be used to indicate the PTRS-DMRS association information. For a maximum layer number of 3 and at least 4 SRS resources, at least four bits can be used to provide/specify the SRS resource. Therefore, at least four values (e.g., two bits) may be used to indicate the PTRS-DMRS association information. The remaining value/bit can be used to specify the PTRS-DMRS association of the second PUSCH transmission.

In some embodiments, the maximum number of values for one or more SRS resources may be configured as the maximum number of values of the SRI field for the second PUSCH transmission group. If the maximum layer number is 4 and/or the number of SRS resources is 3, at least three bits may be used to specify the SRS resource for the second PUSCH transmission occasion group. For layer 3 transmissions, at least two bits can be used to indicate the SRS resource of the second PUSCH transmission occasion group. Therefore, at least 1 bit can be used to indicate the PTRS-DMRS association information. If two PTRS ports are supported, for instance, at least 1 bit or the extended entry of the SRI field can be used to indicate the PTRS-DMRS port association. At least two DMRS ports may share/use one PTRS port, while the other DMRS port may be associated to the other PTRS port. If one PTRS port is supported, one bit may be insufficient to indicate/specify/support the PTRS-DMRS association. At least three DMRS ports may share/use at least one PTRS port. Hence, one bit or the extended entry of the SRI field and/or the antenna field can be combined/integrated/incorporated to indicate the PTRS-DMRS association for at least one PTRS port.

For four layer transmissions, at least one value can be used to indicate/specify the SRS resource. Therefore, at least one bit may indicate the SRI of the second PUSCH transmission occasion group. The other bit and/or extended entry of the SRI field may be used to specify the PTRS-DMRS association information of the second PUSCH transmission occasion group.

G. Embodiment 7

If full power mode is configured as 1, full coherent transmissions may be unsupported. Partial coherent transmissions may support up to 16 TPMI values for layer 1 transmissions, 14 TPMI values for layer 2 transmissions and/or 3 TPMI values for layer 3 transmissions, and/or 3 TPMI values for layer 4 transmissions. At least four bits can be used to indicate/provide/specify the TPMI values. For layer 3 and/or layer 4 transmissions, at least three values can be used to indicate the TPMI (e.g., at least two bits). The remaining two bits of the TPMI field can identify the PTRS-DMRS association information of the second PUSCH transmission occasion group.

In some embodiments, the entry of the TPMI field can be used to indicate the TPMI for the second PUSCH transmission occasion group. For layer 3 transmissions, at least three TPMI values can be extended to at least 9 values by replicating/copying the same precoding matrix at least three times. For layer 4 transmissions, at least three TPMI values can be extended to at least 12 values by replicating/copying the same precoding matrix at least four times. The same precoding matrix with different TPMI values can be used to indicate the association between the PTRS and the DMRS port.

H. Embodiment 8

For SRI indication, the second row (from top to bottom) of table 1900 of FIG. 19 may provide at least six values for specifying at least two SRS resources. Therefore, the number of bits used to indicate the SRI for the second PUSCH transmission occasion group can be reduced/limited to three bits. In some embodiments, layer 4 PUSCH transmissions may use at least two bits to indicate the SRI. Therefore, at least one bit can be used to specify the PTRS-DMRS association information. Another bit of the antenna port indication field can be used to indicate/provide the PTRS-DMRS association information. Therefore, for non-codebook based PUSCH transmissions, the antenna port field and/or the SRI field may jointly be used to (e.g., form a PTRS-DMRS association field/indication to) indicate the PTRS-DMRS association information of the second PUSCH transmission occasion group. For example, one bit of the SRI and/or one bit of the DMRS port indication field may jointly specify the PTRS-DMRS association. For codebook based PUSCH transmissions, the TPMI field and/or the antenna field of the DCI can jointly indicate the association of the PTRS port and the DMRS port of the second PUSCH transmission occasion group.

I. Embodiment 9

The PTRS-DMRS association information of the PUSCH transmission occasion group may be indicated using/according to the PUSCH transmission occasion number. In some embodiments, the PTRS-DMRS association field of the DCI and/or the PUSCH transmission occasion number may indicate the PTRS-DMRS association information.

Figure 24:
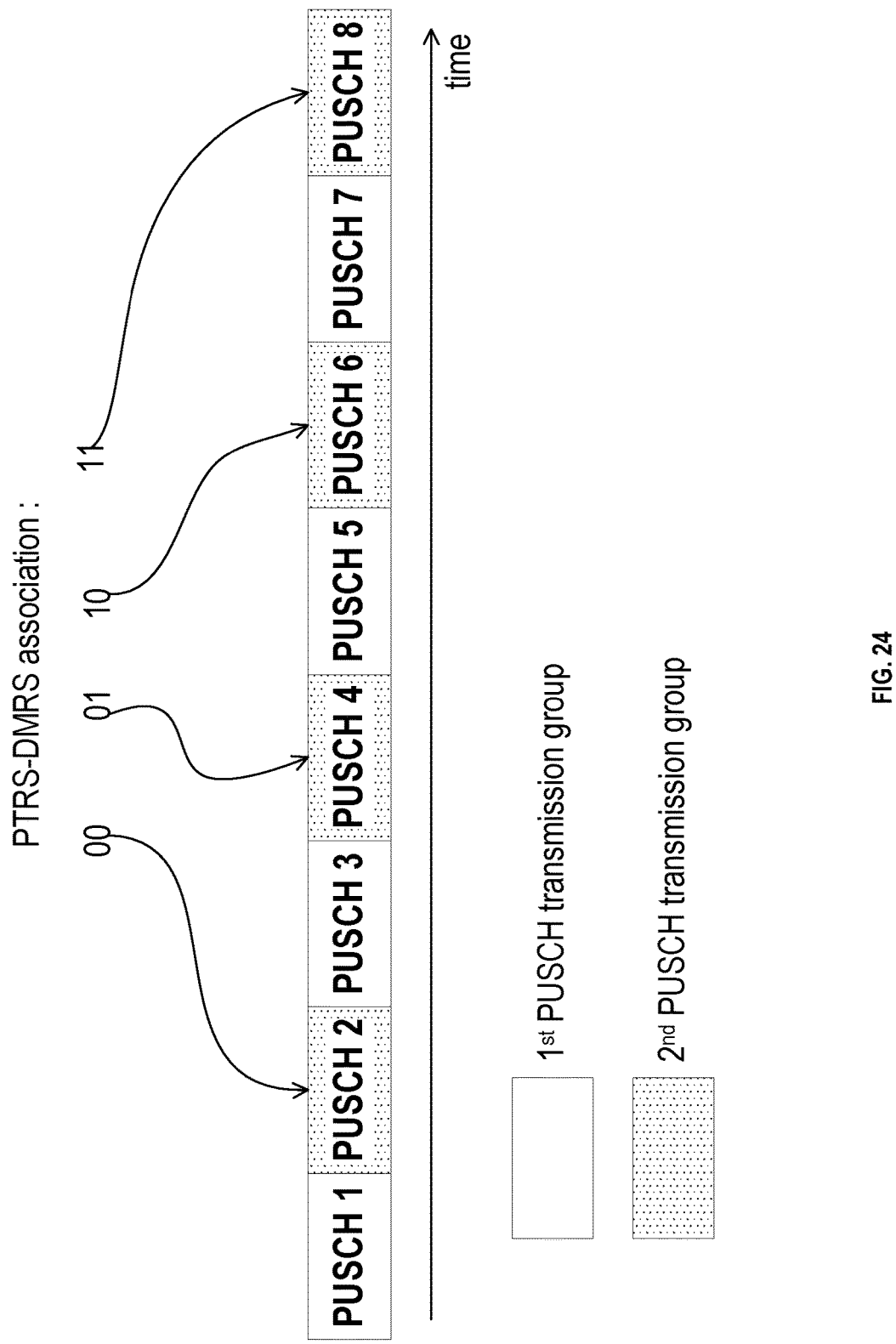
FIGS. 24-27 illustrate various approaches/configurations for indicating the PTRS-DMRS association information using the PUSCH transmission occasion number, in accordance with some embodiments of the present disclosure.
Figure 25:
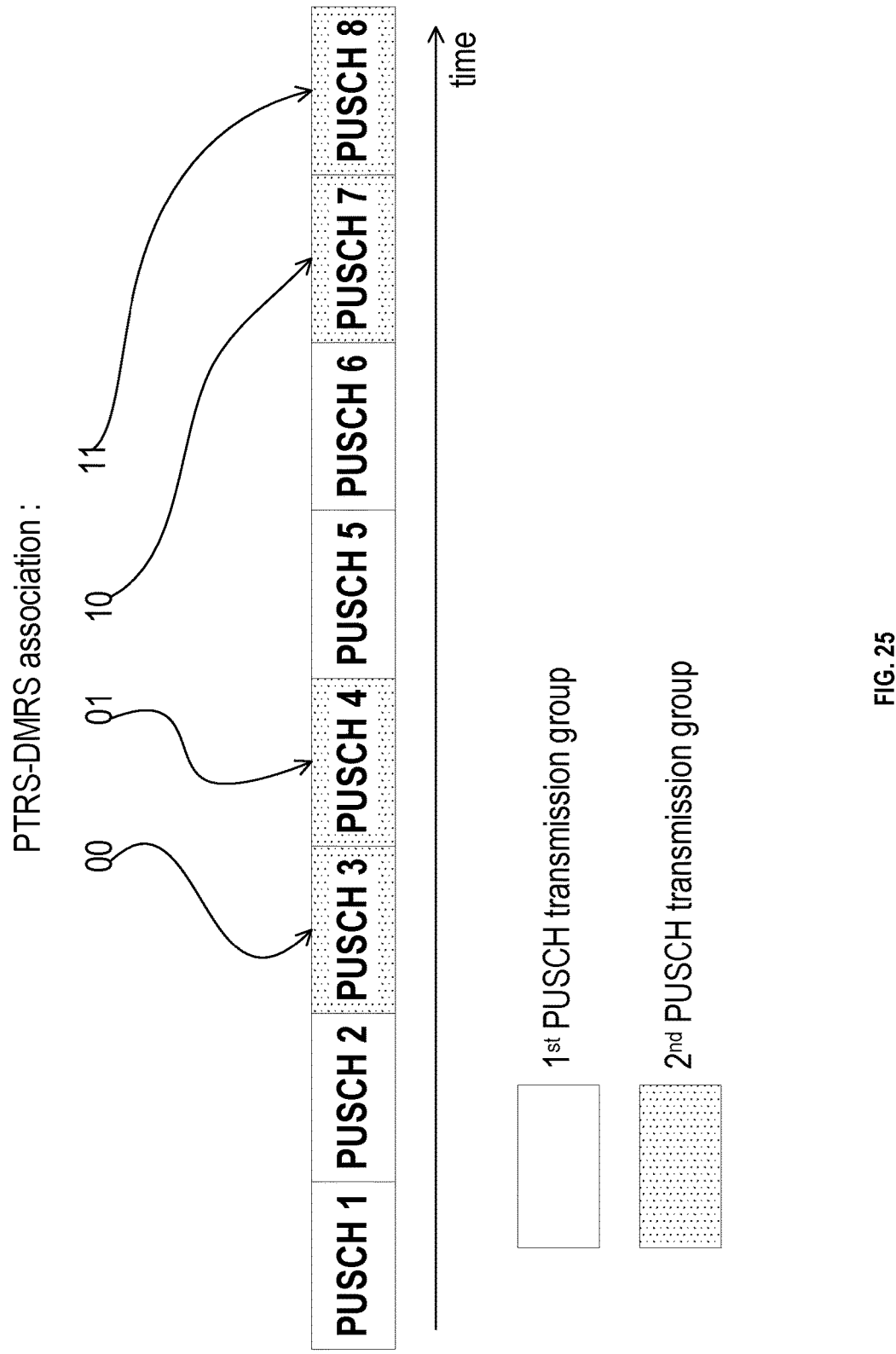

Referring now to FIGS. 24-25, depicted is another example approach for indicating the PTRS-DMRS association information using the PUSCH transmission occasion number. In some embodiments, the PUSCH repetition number may have a value of 8 (or other values). The number of PUSCH transmissions in each PUSCH transmission occasion group may be 4 (or other values). For layer 4 transmissions and/or at least two PTRS ports, the PTRS-DMRS association information of the first SRS resource set may be indicated in the PTRS-DMRS association field of the DCI. The PTRS-DMRS association information of the second SRS resource set may be specified in a predefined and/or RRC-configured manner, such as a special arrange manner of the association of PTRS port and DMRS port and/or a cyclic manner. A second TRP may receive/obtain one or more PUSCH transmissions (e.g., PUSCH2, PUSCH4, PUSCH6, and/or PUSCH8). The PTRS-DMRS association information of the corresponding PUSCH transmissions may be indicated as '00', '01', '10', and/or '11'. If the number of PUSCH transmissions is less than 8, the PTRS-DMRS association information can be indicated in such manner. In some embodiments, other predefined and/or RRC-configured manners may not be precluded. If the PUSCH occasions are mapped according to one or more configurations, as shown in FIGS. 24-25, the PTRS-DMRS association information can be indicated in a same/similar manner.

Figure 26:
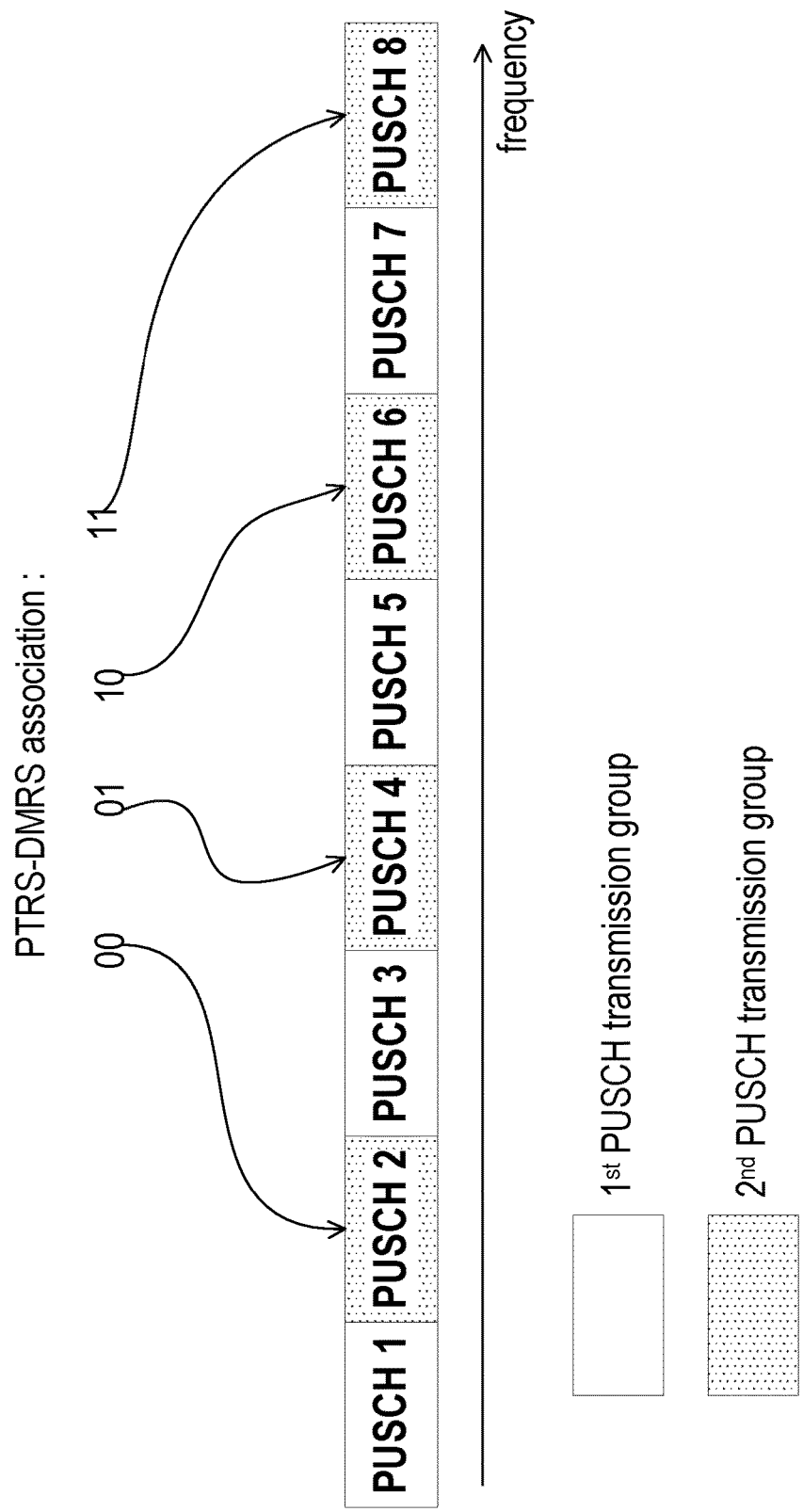
Figure 27:
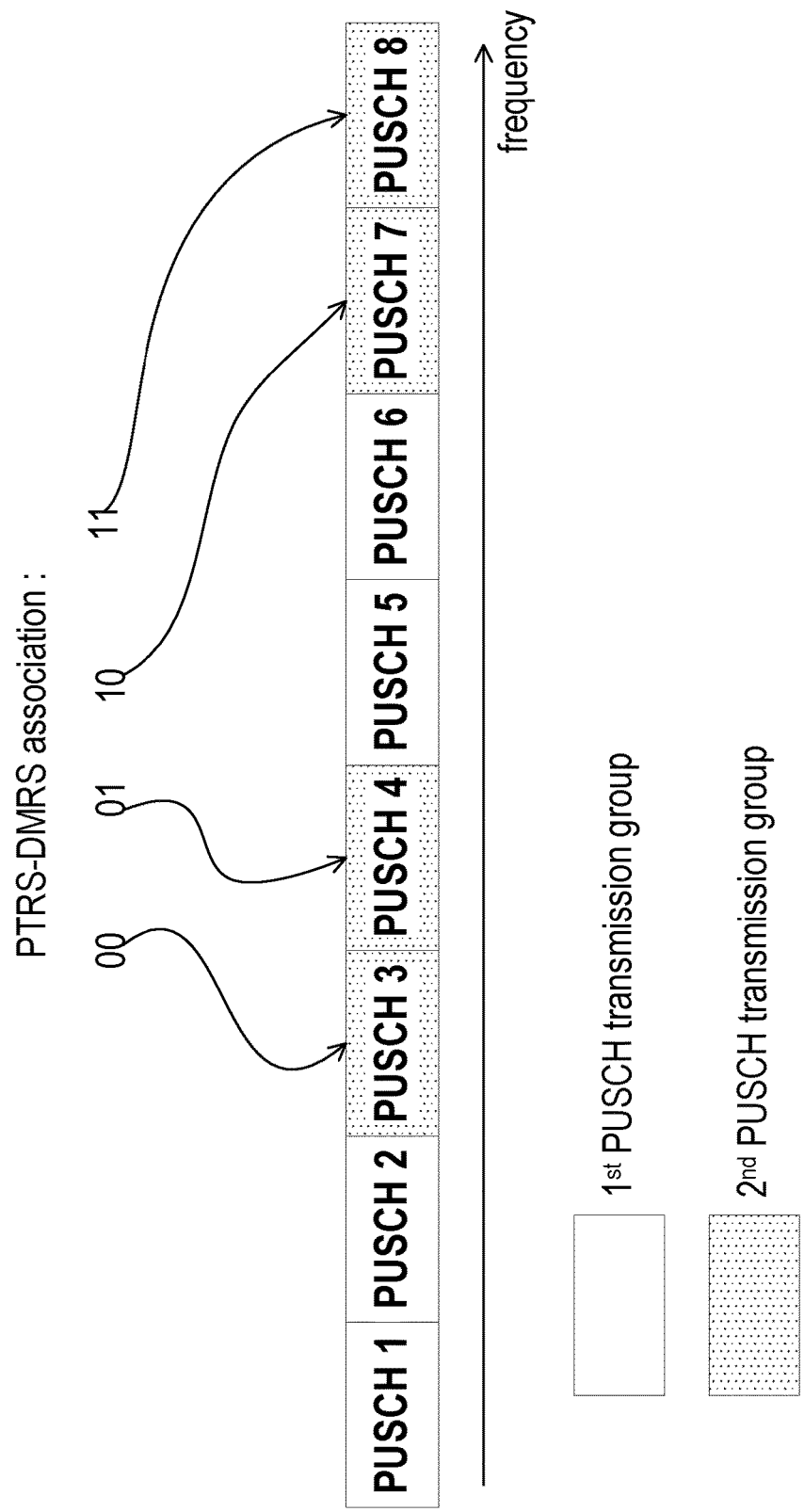

In the case of FDMed PUSCH transmissions, the PUSCH transmission occasions can be mapped/associated/linked to one or more frequencies. The PTRS-DMRS association information of the second PUSCH transmission occasion may be indicated in the cyclic manner described in FIGS. 26-27.

J. Embodiment 10

In some embodiments, a new/novel field (e.g., a field of x bits) may indicate the PTRS-DMRS association information of the second PUSCH transmission occasion group. The new field may be determined/configured according to at least one of radio resource control (RRC) signaling, an antenna port indication field, a SRI, a TPMI and/or other signaling/information. In some embodiments, the new field may be enabled/used in rank 3 and/or rank 4 PUSCH transmissions.

For example, RRC signaling (or other types of signaling) may be used to configure/determine at least two PUSCH transmission occasion groups (e.g., at least two SRS resource sets may be configured). If the PUSCH transmissions are configured via RRC signaling, for example, the wireless communication device may configure/indicate the PTRS-DMRS association information of the at least two PUSCH transmission occasion groups. In some embodiments, the SRI, TPMI, and/or RRC signaling may indicate/configure a value of a transmission layer number as larger than two (e.g., rank 2 transmissions, rank 3 transmissions, and/or other ranks). If the transmission layer number is greater than two, the new field may indicate/provide/specify the PTRS-DMRS association information. For example, for rank 4 transmissions, at least one value can be used to specify the DMRS port. Therefore, at least two bits may be used for the new field. The new field may indicate the association/relationship between the PTRS port and the DMRS port. If a field of x bits is indicated/configured, at least x bits of the antenna port field, the TPMI field, and/or the SRI field may be absent/excluded/omitted. In some embodiments, a total of at least x bits in at least one of an antenna port field, TPMI field and/or SRI field may be absent.

K Embodiment 11

In some embodiments, PTRS-DMRS association information of the second PUSCH transmission occasion group may include or correspond to the PTRS-DMRS association information of the first PUSCH transmission occasion group (e.g., the PTRS-DMRS association information may be the same). The PTRS-DMRS field can be used to indicate the PTRS-DMRS association of both PUSCH transmission occasion groups.

In some embodiments, the same DMRS ports may be scheduled for at least two PUSCH transmission occasion groups (e.g., the first PUSCH transmission occasion group and/or the second PUSCH transmission occasion group). A same/corresponding PTRS-DMRS association information may be specified for the at least two PUSCH transmission occasion groups. The PTRS-DMRS field can indicate the PTRS-DMRS association information of the first PUSCH transmission occasion group and/or the PTRS-DMRS association information of the second PUSCH transmission group.

Higher layer parameter signaling, such as RRC signaling, may be used to define/configure/determine the second port association information. For example, if the second port association is predefined and/or configured (e.g., using RRC signaling) as '00', the PTRS port may be associated to the $1^{st}$ DMRS port which shares the PTRS (e.g., for one PTRS port and/or two PTRS ports). In some embodiments, the second port association may include or correspond to the first port association. The PTRS-DMRS field of the DCI may indicate the first and/or second port association. In some embodiments, higher layer parameter signaling, such as RRC signaling and/or medium access control control element (MAC CE) signaling, may configure/determine/predefine the second port association.

In some embodiments, at least one PTRS port may be indicated and/or configured for each PUSCH transmission occasion group. If one PTRS port is indicated/configured, one or more DMRS ports may share/use the PTRS port. If two or more DMRS are scheduled, a first bit can be used to indicate/specify that the PTRS port is associated with at least one of two (or other values) DMRS ports. The two DMRS port may be chosen/selected/identified from one or more scheduled DMRS ports. The two DMRS ports may include or correspond to the first two DMRS ports (or any two DMRS ports) of the scheduled DMRS ports.

If at least two PTRS ports are indicated/configured, for rank 3 transmissions, the first bit can be used to indicate that the shared PTRS port is associated to a DMRS port. The DMRS port may share/use the PTRS port(s) for the first PUSCH transmission occasion group. The second bit may be used to specify that the shared PTRS port is associated to a DMRS port. The DMRS port may share/use the PTRS port(s) for the second PUSCH transmission occasion group.

If at least two PTRS ports are indicated/configured, for rank 4 transmissions, the first bit may be used to specify at least two PTRS ports (e.g., PTRS port 0 and/or PTRS port 1). The at least two PTRS ports may be associated to a DMRS that shares at least one PTRS port (e.g., PTRS port0 or PTRS port 1) for the first PUSCH transmission occasion group. The second bit may be used to specify at least two PTRS ports (e.g., PTRS port 0 and/or PTRS port 1). The at least two PTRS ports may be associated to a DMRS that shares/uses at least one PTRS port (e.g., PTRS port0 or PTRS port 1) for the second PUSCH transmission occasion group.

L. Methods for Indicating PTRS-DMRS Association Information

Figure 28:
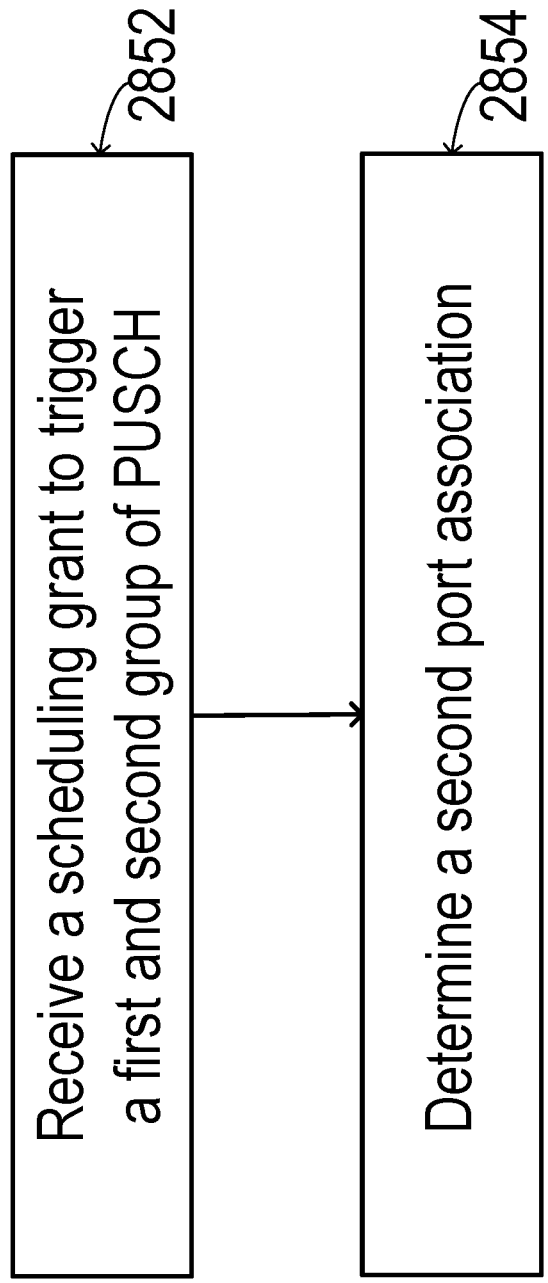
FIG. 28 illustrates a flow diagram of an example method for indicating PTRS-DMRS association information, in accordance with an embodiment of the present disclosure.

FIG. 28 illustrates a flow diagram of a method 2800 for indicating PTRS-DMRS association information. The method 2800 may be implemented using any of the components and devices detailed herein in conjunction with FIGS. 1-27. In overview, the method 2800 may include receiving a scheduling grant to trigger a first and second group of PUSCH (2852). The method 2800 may include determining a second port association (2854).

Referring now to operation (2852), and in some embodiments, a wireless communication device (e.g., a UE) may receive/obtain a scheduling grant from a wireless communication node (e.g., a BS and/or TRP). The wireless communication node may send/transmit/broadcast the scheduling grant (or other information) to the wireless communication device. The scheduling grant may trigger/cause one or more groups of PUSCH transmission occasions, such as a first group of PUSCH transmission occasions and/or a second group of PUSCH transmission occasions. In some embodiments, the scheduling grant may comprise at least one DCI and/or higher layer parameter signaling (e.g., radio resource control (RRC) signaling, MAC CE signaling and/or other types of signaling) for one configured grant. If the scheduling grant comprises the DCI, a PTRS-DMRS association field of the DCI may indicate/specify/identify the first port association (e.g., PTRS-DMRS association information of the first group of PUSCH transmission occasions) and/or the second port association (e.g., PTRS-DMRS association information of the second group of PUSCH transmission occasions). For example, the PTRS-DMRS association field of the DCI may include/provide/specify/indicate SRS resource set information (or other information). In some embodiments, the PTRS-DMRS association field may include or correspond to one or more bits of the DCI. For example, one or more bits of the DCI may be combined/used to configure/generate the PTRS-DMRS association field.

In some embodiments, the PTRS-DMRS association field may comprise a plurality of bits. A first portion (e.g., at least 1 bit) of the plurality of bits can be used to indicate/provide/specify the first port association. A second portion (e.g., at least 3 bits) of the plurality of bits may be used to provide the second port association. Other portions of the PTRS-DMRS association field may be used to specify other association information. In some embodiments, the first and/or second group of PUSCH transmission occasions may have a corresponding number of transmission layers. For example, the first group of PUSCH transmission occasions may have/use at least two (or other values) transmission layers. In the same example, the second group of PUSCH transmission occasions may have at least two (or other values) transmission layers (e.g., rank 2).

The scheduling grant that trigger/causes the first and/or second group of PUSCH transmission occasions may carry/include/provide/indicate/specify scheduling information. The scheduling information may include port association information of PTRS-DMRS and/or other information. The scheduling information can be used for the first group of PUSCH transmission occasions and/or the second group of PUSCH transmission occasions. The port association information of PTRS-DRMS may provide/refer to a PTRS-DRSM association for a first PUSCH transmission occasion group and/or a PTRS-DRMS association for a second PUSCH transmission occasion group. In some embodiments, the scheduling information may comprise at least one of a number of layers being implemented (e.g., rank 1, rank 2, rank 3, and/or rank 4) and/or an antenna port indication of the DMRS. In some embodiments, the port association information may comprise a first port association (e.g., PTRS-DMRS association) for the first group of PUSCH transmission occasions, a second port association for the second group of PUSCH transmission occasions, and/or other information. A portion of the scheduling information that is for the first group of PUSCH transmission may at least be used to determine the second port association. For example, the second port association can be determined by the scheduling information (e.g., layer number, SRI information, TPMI information, DMRS ports information, and/or other information) of the second group of PUSCH transmission occasions and/or the scheduling information of the first group of PUSCH transmission occasions. In some embodiments, each of the first and/or second groups of PUSCH transmission occasions can be associated/related with a SRS resource set, a SRS resource, a spatial relation, a transmission configuration indication (TCI) state, quasi co-location information, power control, and/or other information.

Referring now to operation (2854), and in some embodiments, a wireless communication device may determine the second port association. For example, the wireless communication device and/or wireless communication node may determine/configure the second port association according to a SRI field and/or TPMI field. The SRI field and/or TPMI field may include or correspond to information of the SRI/TPMI, a data field in a data structure/message, and/or other information associated to the SRI/TPMI. The second port association may be determined/configured according to a SRI field, a TPMI field (e.g., TPMI information), an antenna port indication field for a DMRS, a PUSCH occasion number, and/or other information. The antenna port indication field may include or correspond to information associated with the antenna port indication. In some embodiments, the antenna port indication field may indicate/provide/identify/specify a value (e.g., values 0-3) that identifies/specifies the second port association. For example, an antenna port indication field with a value of 0 may indicate an association/relationship between a first PTRS port (e.g., PTRS port 0) and a $1^{st}$ scheduled DMRS port (or other DMRS ports) for the second PUSCH transmission occasion group.

In some embodiments, at least another bit of the antenna port indication field of the DCI may be used to provide/specify one or more scheduled DMRS ports. At least another bit of the antenna port indication field can be used to indicate the second port association (e.g., PTRS-DMRS association information for the second group of PUSCH transmission occasions). For example, bit 0 (or other bits) of the DMRS port indication field (e.g., the antenna port indication field) may be used to provide the scheduled DMRS port(s). In the same example, bits 1 and 2 (or other bits) may be used to indicate the association between a PTRS port and a DMRS port for a second group of PUSCH transmission occasions. In some embodiments, at least another bit of the TPMI field and/or SRI field may be used to indicate/identify a scheduling precoding matrix and/or a SRS resource (e.g., a first SRS resource, a second SRS resource, and/or other SRS resources). At least one bit of the antenna port indication field can be used to provide the second port association. Therefore, the TPMI field, the SRI field, the antenna port indication field, and/or other fields may be combined to indicate association information. For example, a new field comprising at least one bit from at least one of the antenna port field, the TPMI field, and/or the SRI field may be defined/generated/configured. The new field may be defined to indicate/specify the second port association.

In some embodiments, the second port association for each PUSCH transmission occasion of the second group of PUSCH transmission occasions may be indicated/specified/identified in a cyclic manner. The second port association for each PUSCH transmission occasion of the second group of PUSCH transmission occasions may be indicated according to a respective PUSCH occasion number (e.g., PUSCH0, PUSCH1, PUSCH2, and/or other occasion numbers) of the PUSCH transmission occasion. For example, the PTRS-DMRS association information for each corresponding PUSCH transmissions may be indicated as '00', '01', '10', and/or '11'. A value of '00', for example, may indicate the PTRS-DMRS association information of PUSCH2 (or other PUSCH occasions). In some embodiments, a number of transmission layers may be larger than 2 (or other values) for the first group of PUSCH transmission occasions and/or for the second group of PUSCH transmission occasions. For example, the first and/or second group of PUSCH transmission occasions may have a number of transmission layers corresponding to 3 (e.g., rank 3 PUSCH transmissions). In some embodiments, the second port association may include or correspond to the first port association. For example, the second port association may be the same as the first port association. In some embodiments, a PTRS-DMRS field of the DCI (or other fields of the DCI) may include/carry/indicate/identify the first and/or second port association. In some embodiments, higher layer parameter signaling (e.g., RRC signaling and/or MAC CE signaling) may determine/predefine/generate/configure the second port association.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method for communication, comprising:

receiving, by a wireless communication device from a wireless communication node, a downlink control information (DCI) signaling to trigger a first group of a plurality of physical uplink shared channel (PUSCH) transmission occasions and a second group of a plurality of PUSCH transmission occasions for PUSCH repetition transmissions, wherein the first group of PUSCH transmission occasions is associated with a first sounding reference signal (SRS) resource set and the second group of PUSCH transmission occasions is associated with a second SRS resource set; and transmitting, by the wireless communication device to the wireless communication node, a PUSCH transmission according to at least one of the first group of PUSCH transmission occasions or the second group of PUSCH transmission occasions, wherein scheduling information carried by the DCI signaling at least includes port association information between at least one phase tracking reference signal (PTRS) and at least one demodulation reference signal (DMRS), the port association information comprising a first port association for the first group of PUSCH transmission occasions and a second port association for the second group of PUSCH transmission occasions, wherein when a number of transmission layers is 2, the port association information comprises 2 bits, wherein a most significant bit (MSB) of the 2 bits indicates the first port association for the first group of PUSCH transmission occasions, and a least significant bit (LSB) of the 2 bits indicates the second port association for the second group of PUSCH transmission occasions.

2. The method of claim 1, wherein the first group of PUSCH transmission occasions is further associated with a first set of power control parameters, and the second group of PUSCH transmission occasions is further associated with a second set of power control parameters.

3. The method of claim 1, wherein the second port association corresponds to at least one of:

a SRS resource indicator (SRI) field, or a transmission precoding matrix indicator (TPMI) field.

4. The method of claim 1, wherein the port association information comprises a plurality of bits, a first portion of the plurality of bits is used to indicate the first port association, and a second portion of the plurality of bits is used to indicate the second port association.

5. A method for communication, comprising:

sending, by a wireless communication node to a wireless communication device, a downlink control information (DCI) signaling to trigger a first group of a plurality of physical uplink shared channel (PUSCH) transmission occasions and a second group of a plurality of PUSCH transmission occasions for PUSCH repetition transmissions, wherein the first group of PUSCH transmission occasions is associated with a first sounding reference signal (SRS) resource set and the second group of PUSCH transmission occasions is associated with a second SRS resource set; and receiving, by the wireless communication node from the wireless communication device, a PUSCH transmission according to at least one of the first group of PUSCH transmission occasions or the second group of PUSCH transmission occasions, wherein scheduling information carried by the DCI signaling at least includes port association information between at least one phase tracking reference signal (PTRS) and at least one demodulation reference signal (DMRS), the port association information comprising a first port association for the first group of PUSCH transmission occasions and a second port association for the second group of PUSCH transmission occasions, wherein when a number of transmission layers is 2, the port association information comprises 2 bits, wherein a most significant bit (MSB) of the 2 bits indicates the first port association for the first group of PUSCH transmission occasions, and a least significant bit (LSB) of the 2 bits indicates the second port association for the second group of PUSCH transmission occasions.

6. The method of claim 5, wherein the first group of PUSCH transmission occasions is further associated with a first set of power control parameters, and the second group of PUSCH transmission occasions is further associated with a second set of power control parameters.

7. The method of claim 5, wherein the second port association corresponds to at least one of:
a SRS resource indicator (SRI) field, or
a transmission precoding matrix indicator (TPMI) field.

8. The method of claim 5, wherein the port association information comprises a plurality of bits, a first portion of the plurality of bits is used to indicate the first port association, and a second portion of the plurality of bits is used to indicate the second port association.

9. A wireless communication device, comprising: at least one processor and a receiver configured to:
receive, from a wireless communication node, a downlink control information (DCI) signaling to trigger a first group of a plurality of physical uplink shared channel (PUSCH) transmission occasions and a second group of a plurality of PUSCH transmission occasions for PUSCH repetition transmissions, wherein the first group of PUSCH transmission occasions is associated with a first sounding reference signal (SRS) resource set and the second group of PUSCH transmission occasions is associated with a second SRS resource set; and
transmit, to the wireless communication node, a PUSCH transmission according to at least one of the first group of PUSCH transmission occasions or the second group of PUSCH transmission occasions,
wherein scheduling information carried by the DCI signaling at least includes port association information between at least one phase tracking reference signal (PTRS) and at least one demodulation reference signal (DMRS), the port association information comprising a first port association for the first group of PUSCH transmission occasions and a second port association for the second group of PUSCH transmission occasions,
wherein when a number of transmission layers is 2, the port association information comprises 2 bits, wherein a most significant bit (MSB) of the 2 bits indicates the first port association for the first group of PUSCH transmission occasions, and a least significant bit (LSB) of the 2 bits indicates the second port association for the second group of PUSCH transmission occasions.

10. The wireless communication device of claim 9, wherein the first group of PUSCH transmission occasions is further associated with a first set of power control parameters, and the second group of PUSCH transmission occasions is further associated with a second set of power control parameters.

11. The wireless communication device of claim 9, wherein the second port association corresponds to at least one of:
a SRS resource indicator (SRI) field, or
a transmission precoding matrix indicator (TPMI) field.

12. The method of claim 9, wherein the port association information comprises a plurality of bits, a first portion of the plurality of bits is used to indicate the first port association, and a second portion of the plurality of bits is used to indicate the second port association.

13. A wireless communication node, comprising: at least one processor and a transmitter configured to:
send, by a wireless communication node to a wireless communication device, a downlink control information (DCI) signaling to trigger a first group of a plurality of physical uplink shared channel (PUSCH) transmission occasions and a second group of a plurality of PUSCH transmission occasions for PUSCH repetition transmissions, wherein the first group of PUSCH transmission occasions is associated with a first sounding reference signal (SRS) resource set and the second group of PUSCH transmission occasions is associated with a second SRS resource set; and
receive, by the wireless communication node from the wireless communication device, a PUSCH transmission according to at least one of the first group of PUSCH transmission occasions or the second group of PUSCH transmission occasions,
wherein scheduling information carried by the DCI signaling at least includes port association information between at least one phase tracking reference signal (PTRS) and at least one demodulation reference signal (DMRS), the port association information comprising a first port association for the first group of PUSCH transmission occasions and a second port association for the second group of PUSCH transmission occasions,
wherein when a number of transmission layers is 2, the port association information comprises 2 bits, wherein a most significant bit (MSB) of the 2 bits indicates the first port association for the first group of PUSCH transmission occasions, and a least significant bit (LSB) of the 2 bits indicates the second port association for the second group of PUSCH transmission occasions.

14. The wireless communication node of claim 13, wherein the first group of PUSCH transmission occasions is further associated with a first set of power control parameters, and the second group of PUSCH transmission occasions is further associated with a second set of power control parameters.

* * * * *